(12) United States Patent
Yoshimi et al.

(10) Patent No.: US 9,886,271 B2
(45) Date of Patent: Feb. 6, 2018

(54) CHANGE METHOD, APPARATUS, AND RECORDING MEDIUM

(71) Applicant: FUJITSU LIMITED, Kawasaki-shi, Kanagawa (JP)

(72) Inventors: Ryouji Yoshimi, Kawasaki (JP); Kuniaki Shimada, Kawasaki (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 530 days.

(21) Appl. No.: 14/221,398

(22) Filed: Mar. 21, 2014

(65) Prior Publication Data
US 2014/0298291 A1    Oct. 2, 2014

(30) Foreign Application Priority Data

Mar. 28, 2013   (JP) .................................. 2013-070411

(51) Int. Cl.
*G06F 9/44*       (2006.01)
(52) U.S. Cl.
CPC ...................................... *G06F 8/76* (2013.01)
(58) Field of Classification Search
CPC ..... G06F 8/20; G06F 8/36; G06F 8/61; G06F 8/70; G06F 8/71; G06F 8/76
See application file for complete search history.

(56) References Cited

U.S. PATENT DOCUMENTS

| | | | | |
|---|---|---|---|---|
| 6,098,098 A | * | 8/2000 | Sandahl | H04L 41/082 709/221 |
| 6,202,206 B1 | * | 3/2001 | Dean | G06F 8/61 709/220 |
| 8,161,047 B2 | * | 4/2012 | Akiyama | G06F 9/44505 707/736 |
| 8,356,088 B2 | * | 1/2013 | Montagna | G06F 8/71 707/649 |
| 8,417,796 B2 | * | 4/2013 | Crosbie | G06F 8/63 709/219 |
| 8,639,798 B2 | * | 1/2014 | Akiyama | G06F 9/44505 707/609 |
| 9,184,996 B2 | * | 11/2015 | Kagitani | H04L 41/0853 |
| 2001/0054091 A1 | | 12/2001 | Lenz et al. | |
| 2005/0210465 A1 | * | 9/2005 | Sasaki | G06F 8/65 717/175 |

(Continued)

FOREIGN PATENT DOCUMENTS

JP   05-094283    4/1993
JP   2000-105693  4/2000

(Continued)

OTHER PUBLICATIONS

Japanese Office Action dated Sep. 20, 2016 in related Japanese Application No. 2013-070411.

*Primary Examiner* — Marina Lee
(74) *Attorney, Agent, or Firm* — Staas & Halsey LLP

(57) ABSTRACT

A method performed by a computer, the method includes: determining a portion of a program run by a first information processing apparatus, the portion corresponding to a difference between first configuration information related to the first information processing apparatus and second configuration information related to a second information processing apparatus; and deciding a change type to be applied to the portion of the program, based on details of the difference.

18 Claims, 25 Drawing Sheets

(56) References Cited

U.S. PATENT DOCUMENTS

| | | | | |
|---|---|---|---|---|
| 2007/0168478 | A1* | 7/2007 | Crosbie | G06F 8/63 |
| | | | | 709/221 |
| 2008/0294937 | A1* | 11/2008 | Ueda | G06F 9/4856 |
| | | | | 714/15 |
| 2009/0187596 | A1* | 7/2009 | Akiyama | G06F 9/44505 |
| 2010/0106821 | A1* | 4/2010 | Akiyama | G06F 9/44505 |
| | | | | 709/224 |
| 2011/0010420 | A1* | 1/2011 | Kagitani | H04L 67/306 |
| | | | | 709/203 |
| 2012/0110142 | A1* | 5/2012 | Montagna | G06F 8/71 |
| | | | | 709/220 |
| 2013/0198352 | A1* | 8/2013 | Kalyanaraman | H04L 67/34 |
| | | | | 709/223 |
| 2013/0262680 | A1* | 10/2013 | Gujarathi | G06F 9/5011 |
| | | | | 709/226 |
| 2014/0156813 | A1* | 6/2014 | Zheng | H04L 67/16 |
| | | | | 709/220 |
| 2014/0298291 | A1* | 10/2014 | Yoshimi | G06F 8/76 |
| | | | | 717/121 |

FOREIGN PATENT DOCUMENTS

| | | |
|---|---|---|
| JP | 2001-222436 | 8/2001 |
| JP | 2005-250722 | 9/2005 |
| JP | 2009-217327 | 9/2009 |

\* cited by examiner

FIG. 13
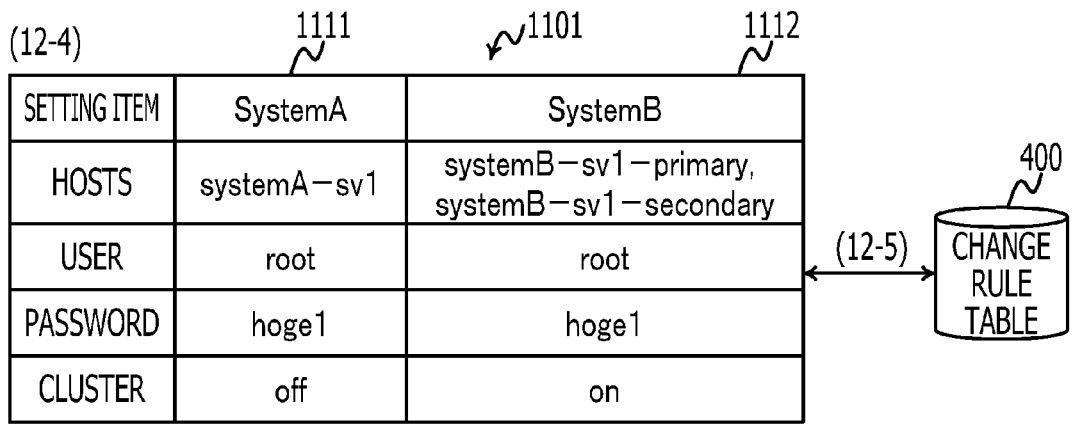
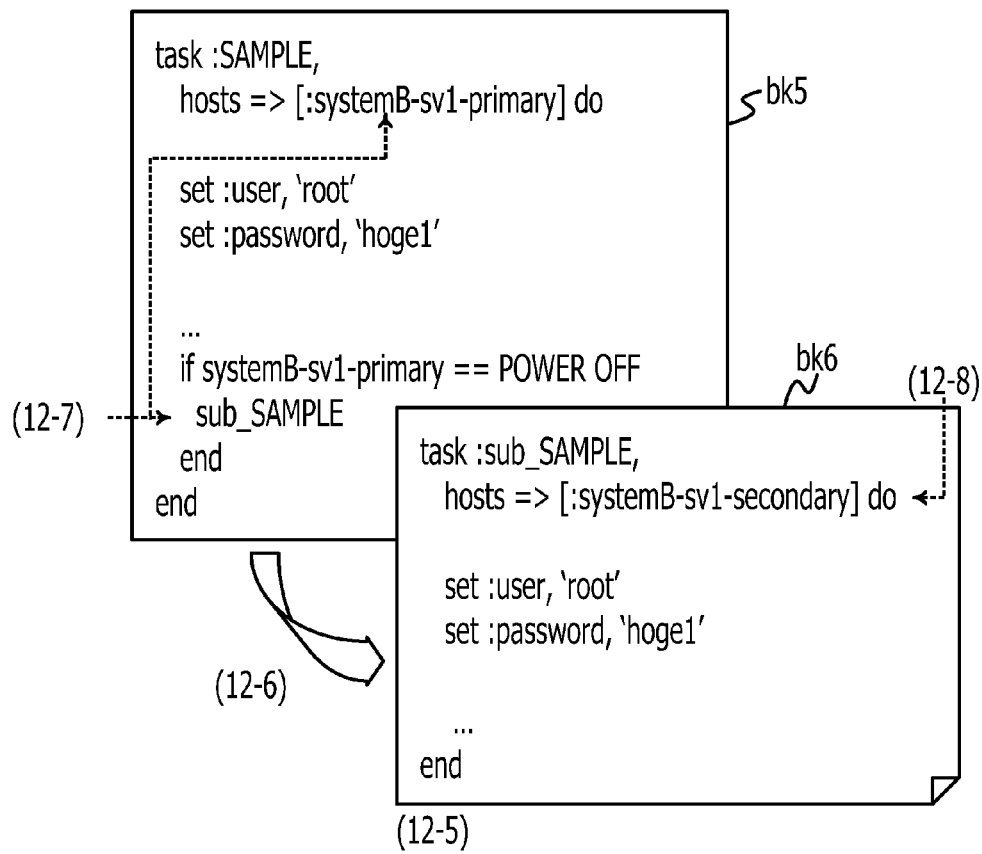

CHANGE METHOD, APPARATUS, AND RECORDING MEDIUM

CROSS-REFERENCE TO RELATED APPLICATION

This application is based upon and claims the benefit of priority from the prior Japanese Patent Application No. 2013-070411 filed on Mar. 28, 2013, the entire contents of which are incorporated herein by reference.

FIELD

The embodiment discussed herein is related to a change method, an apparatus, and a recording medium.

BACKGROUND

There have been cases where a program to run on a new system is generated from a program which runs on the existing system. In such a case, a change such as replacement of a parameter value depending on the system environment with a parameter value of the new system has been made to the program of the existing system. Examples of the parameter value depending on the system environment include an Internet protocol (IP) address and a password.

However, the related art may not be able to generate a program to run on the new system by simply replacing the parameter value depending on the system environment. That is, the related art may have difficulty in determining what type of change to make to the program. For example, the operator has to analyze the difference between the existing and new systems to determine what type of change to make to the program. This increases the workload related to the program change work.

For example, Japanese Laid-open Patent Publication No. 2005-250722 discloses a related art of automatically generating change information related to only a started system from yet-to-be-changed information of a processing apparatus and changed information of the processing apparatus and then changing an input/output configuration information table and a processing apparatus configuration information table of a particular system without affecting other systems.

SUMMARY

According to an aspect of the invention, a method performed by a computer, the method includes: determining a portion of a program run by a first information processing apparatus, the portion corresponding to a difference between first configuration information related to the first information processing apparatus and second configuration information related to a second information processing apparatus; and deciding a change type to be applied to the portion of the program, based on details of the difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates the third example of a change to the program;

DESCRIPTION OF EMBODIMENT

A change apparatus, change method, and recording medium recording a change program according to the present embodiment will be described in detail with reference to the drawings.

One Example of Change Program

Figure 1:
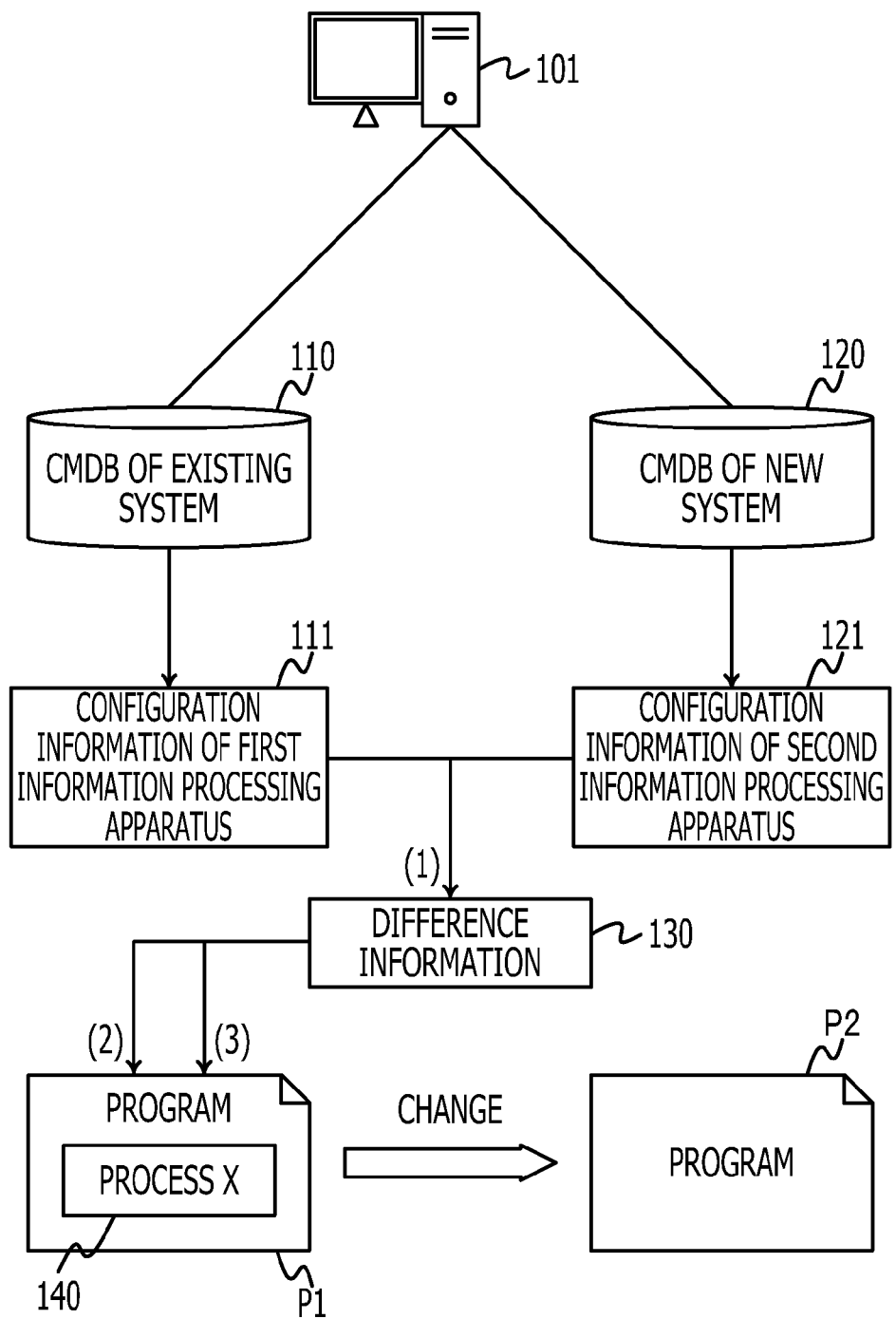
FIG. 1 illustrates one example of a change method according to an embodiment.

FIG. 1 illustrates one example of a change method according to the present embodiment. In FIG. 1, a change apparatus 101 is a computer for supporting program change work. For example, when generating a program P2 to be applied to a second information processing apparatus from a program P1 applied to a first information processing apparatus, the change apparatus 101 decides a change type to be applied to the program P1.

The first information processing apparatus is a computer having an operating system (OS) for constructing a first system installed therein and makes settings desirable in constructing the first system. The first system is, for example, the existing system (old system) in operation. Hereafter, the first system will be referred to as "the existing system".

The second information processing apparatus is a computer having an OS for constructing a second system installed therein and makes settings desirable in constructing the second system. The second system is, for example, a new system to be constructed based on the existing system. Hereafter, the second system will be referred to as "the new system".

The program P1is, for example, a program for logging in to the first information processing apparatus and executing commands thereon. Similarly, the program P2 is, for example, a program for logging in to the second information processing apparatus and executing commands thereon. In the present embodiment, the programs P1 and P2 have the same functions. For example, the commands are intended to make settings on the information processing apparatus when constructing a system. The commands are, for example, respective commands for setting up an OS, creating a folder, and creating a file.

The first and second information processing apparatuses may be, for example, virtual machines. A virtual machine refers to a virtual computer which runs in an execution environment constructed by dividing the hardware resources of a computer. The substance of a virtual machine includes, for example, software such as a program or OS, variables provided to the software, and information specifying a hardware resource for executing the software.

The change apparatus 101 can access a configuration management database (CMDB) 110 of the existing system and a CMDB 120 of the new system. A CMDB refers to a database for centrally managing configuration information of a system.

When generating a program P2 to run on the new system from the program P1 which runs on the existing system, it may be difficult to generate a program P2 by simply replacing a parameter value depending on the system environment. For example, if the program P1 includes a process of setting the same password on multiple information processing apparatuses and if change of only the password of one information processing apparatus is desired, it is difficult to generate a program P2 by simply replacing a parameter value. For this reason, it is difficult to determine what portion of the program P1 to be changed and how to change the portion to be changed.

For this reason, the change apparatus 101 according to the present embodiment detects a change portion corresponding to the difference in configuration information between the existing and new systems, of the program P1 which runs on the existing system and then decides a change type to be applied to the detected portion, based on details of the difference. Thus, the workload related to the program P1 change work is reduced. Hereafter, an example of the process performed by the change apparatus 101 will be described.

(1) The change apparatus 101 acquires difference information 130 representing the difference between configuration information 111 of the first information processing apparatus and configuration information 121 of the second information processing apparatus. The configuration information of each information processing apparatus includes the values of setting items set on the information processing apparatus. Examples of the setting items include a host name identifying an information processing apparatus, a user name using the information processing apparatus, and a password for logging in to the information processing apparatus.

For example, the change apparatus 101 acquires the configuration information 111 of the first information processing apparatus from the CMDB 110 of the existing system. The change apparatus 101 also acquires the configuration information 121 of the second information processing apparatus corresponding to the configuration information 111 of the first information processing apparatus from the CMDB 120 of the new system. Note that the respective information items of the information processing apparatuses are associated with each other. The change apparatus 101 then acquires difference information 130 by comparing the configuration information 111 of the first information processing apparatus with the configuration information 121 of the second information processing apparatus.

(2) The change apparatus 101 detects the block of a process corresponding to the acquired difference information 130 from the blocks of the processes described in the program P1 applied to the first information processing apparatus. A process refers to a single process defined in the program and is, e.g., a task. A block refers to one code or a set of codes corresponding to a process. The range of a block is specified by, for example, a process name (e.g., task name) or symbol (e.g., begin, end, etc.).

For example, the change apparatus 101 refers to the difference information 130 and then identifies a setting item value different from a corresponding setting item value of the second information processing apparatus among multiple setting item values set on the first information processing apparatus. The change apparatus 101 then detects the block of a process including the specified setting item value from the program P1. In an example of FIG. 1, the block 140 of a process X is detected.

(3) The change apparatus 101 decides a change type to be applied to the detected block 140 of the process X based on details of the difference information 130. As used herein, a change type refers to a change type to be applied to the program P1 which runs on the existing system in order to generate a program P2 to run on the new system.

For example, based on the difference information 130, the change apparatus 101 determines whether the first and second information processing apparatuses differ from each other in the value of a particular setting item identifying each information processing apparatus of multiple setting items set on these information processing apparatuses. The particular setting item is, for example, a host name.

The change apparatus 101 also determines whether these information processing apparatuses differ from each other in the value of any setting item other than the particular setting item of the multiple setting items. Examples of the other setting items include a password. If the information processing apparatuses differ from each other in the value of the particular setting item and if the information processing apparatuses also differ from each other in the value of any other setting item, the change apparatus 101 decides a type which generates the block of a process Y different from the process X, as the change type.

If the information processing apparatuses differ from each other in the value of the particular setting item and if the information processing apparatuses are the same in the values of the other setting items, the change apparatus 101 decides a type which replaces the value of a particular setting item in the block 140 of the process X, as the change type.

As seen above, the change apparatus 101 detects, from the program P1 applied to the first information processing apparatus, the block 140 of the process X corresponding to the difference information 130, which represents the difference between the configuration information 111 of the first information processing apparatus and the configuration information 121 of the second information processing apparatus. The change apparatus 101 also decides a change type to be applied to the block 140 of the process X in the program P1 based on details of the difference information 130.

Thus, when generating a program P2 to be applied to the second information processing apparatus, the operator can determine what portion of the program P1 to change and how to change the portion to be changed. As a result, a workload for the operator related to the program P1 change work can be reduced. The operator can also generate a program P2 to be applied to the second information processing apparatus by applying the decided change type to the block 140 of the process X in the program P1.

Example of Hardware Configuration of Change Apparatus 101

Figure 2:
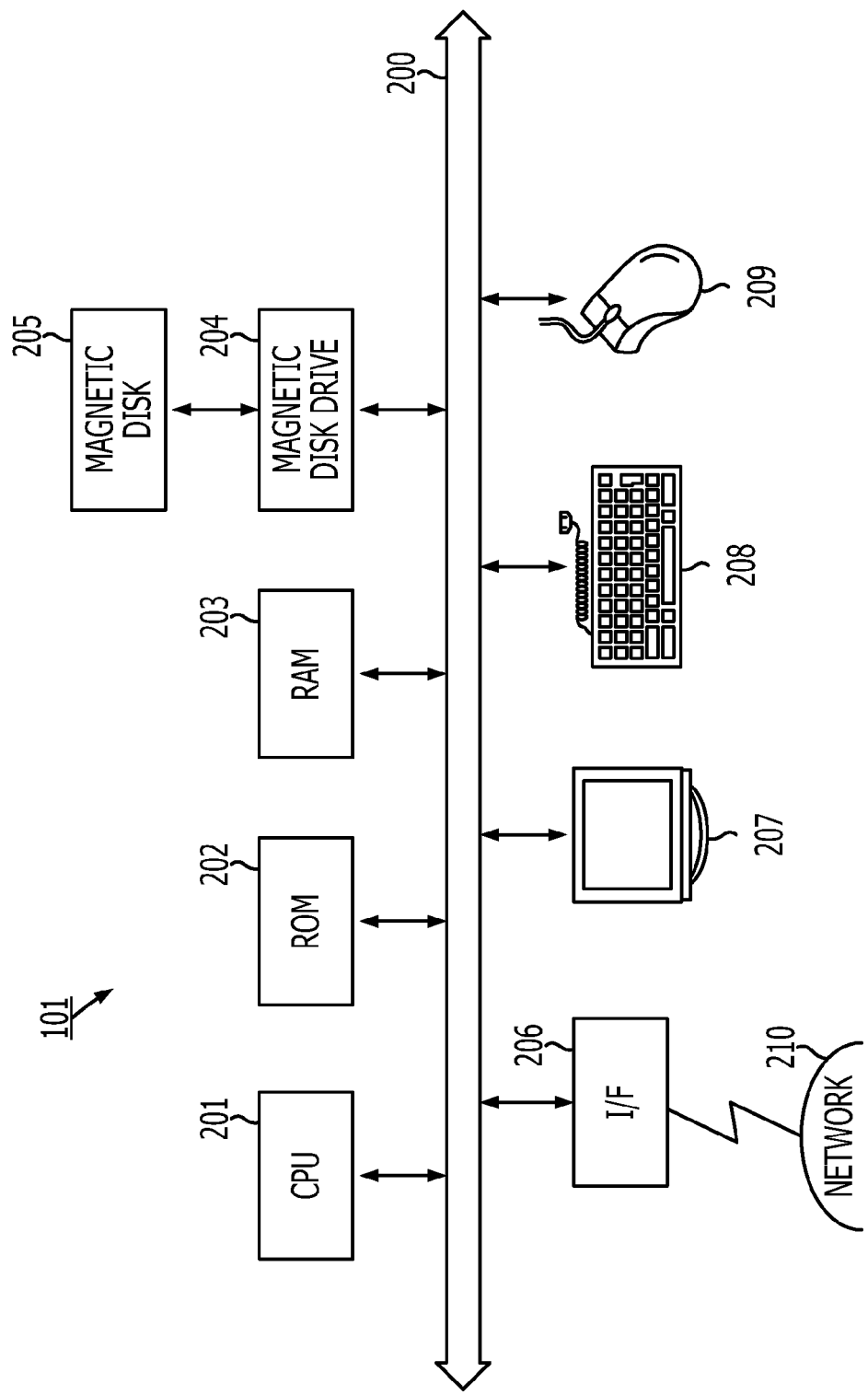
FIG. 2 illustrates an example of the hardware configuration of a change apparatus.

FIG. 2 illustrates an example of the hardware configuration of the change apparatus 101. In FIG. 2, the change apparatus 101 includes a central processing unit (CPU) 201, a read-only memory (ROM) 202, a random access memory (RAM) 203, a magnetic disk drive 204, a magnetic disk 205, an interface (I/F) 206, a display 207, a keyboard 208, and a mouse 209. These components are connected together through a bus 200.

The CPU 201 controls the entire change apparatus 101. The ROM 202 is storing programs such as a boot program. The RAM 203 is used as a work area for the CPU 201. The magnetic disk drive 204 controls read or write of data from or to the magnetic disk 205 under the control of the CPU 201. The magnetic disk 205 is storing data written under the control of the magnetic disk drive 204.

The I/F 206 is connected to a network 210 through a communication line and connected to other apparatuses through the network 210. The I/F 206 serves as an interface between the network 210 and the inside of the change apparatus 101 and controls input or output of data from or to external apparatuses. The I/F 206 is, for example, a modem or LAN adapter.

The display 207 displays data such as documents, images, or function information. Such data includes a cursor, icons, and tool boxes. The display 207 is, for example, a CRT, TFT liquid crystal display, or plasma display.

The keyboard 208 includes keys for entering characters, numbers, instructions, or the like and is used to input data. The keyboard 208 may be a touchscreen input pad, numeric keypad, or the like. The mouse 209 is used to, for example, move the cursor, select a range, move the window, or change the size. Note that the change apparatus 101 does not have to include all the components. For example, it does not necessarily have to include the display 207, keyboard 208, or mouse 209, or the like.

Difference Information List DL

Next, the contents of a difference information list DL used by the change apparatus 101 will be described. The difference information list DL is generated in a storage device such as the RAM 203 or magnetic disk 205 illustrated in FIG. 2.

Figure 3:
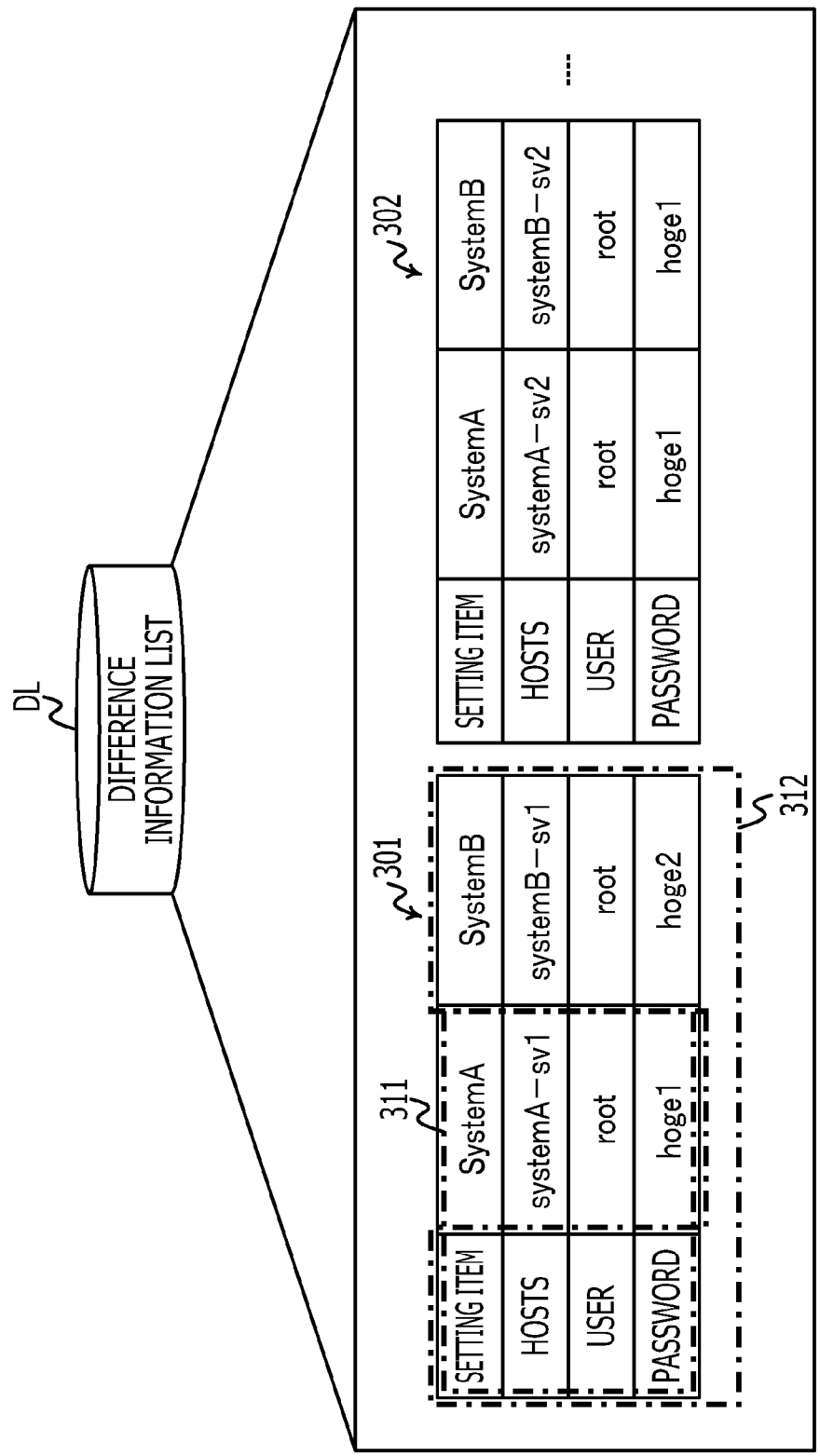
FIG. 3 illustrates an example of the contents of a difference information list.

FIG. 3 illustrates an example of the contents of a difference information list DL. In FIG. 3, the difference information list DL is a list of difference information (e.g., difference information 301, 302) representing the difference between configuration information of an information processing apparatus EM of the existing system (system A) and configuration information of an information processing apparatus NM of a new system (system B).

For example, the difference information 301 is information representing the difference between configuration information 311 of the information processing apparatus EM of the existing system and configuration information 312 of the information processing apparatus NM of the new system. The configuration information 311 of the information processing apparatus EM of the existing system includes a host name "systemA-sv1", a user name "root", and a password "hoge1".

The configuration information 312 of the information processing apparatus NM of the new system includes a host name "systemB-sv1", a user name "root", and a password "hoge2". In this case, the configuration information 311 of the information processing apparatus EM of the existing system and the configuration information 312 of the information processing apparatus NM of the new system include differ from each other in host name and password.

Contents of Change Rule Table 400

Next, the contents of a change rule table 400 used by the change apparatus 101 will be described. The change rule table 400 is stored in a storage device such as the ROM 202, RAM 203, or magnetic disk 205 illustrated in FIG. 2.

Figure 4:
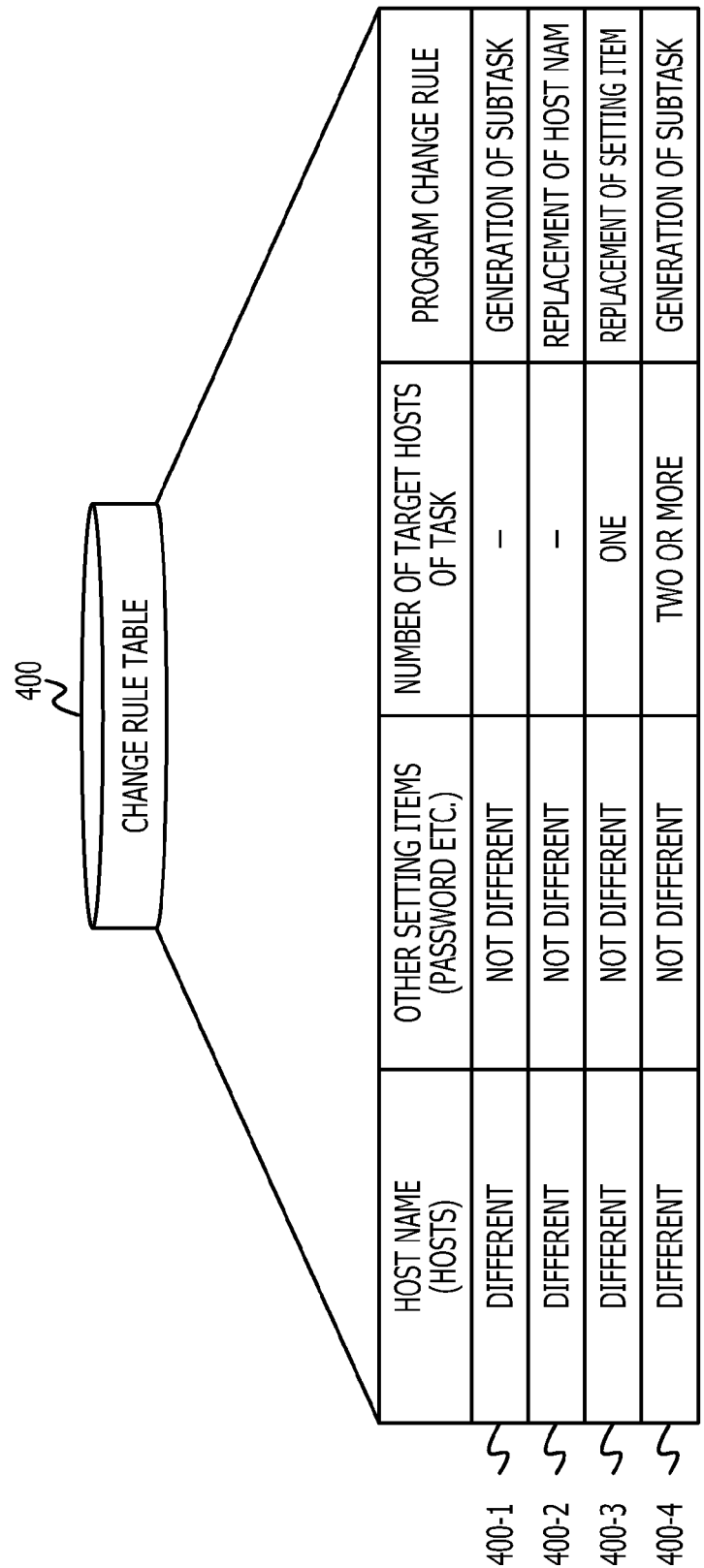
FIG. 4 illustrates an example of the contents of a change rule table.

FIG. 4 illustrates an example of the contents of the change rule table 400. In FIG. 4, the change rule table 400 has the fields of Host Name, Other Setting Items, Number of Target Hosts of Task, and Program Change Rule. Sets of rule information 400-1 to 400-4 are stored as records by setting information in the respective fields.

If the existing and new systems differ from each other in the host name, "Different" is set in the Host Name field; if the existing and new systems do not differ from each other in the host name, "Not Different" is set therein. If the existing and new systems differ from each other in any setting item (e.g., password, etc.) other than the host name, "Different" is set in the Other Setting Items field; if the existing and new systems do not differ from each other in the other setting items, "Not Different" is set therein.

If the number of target hosts of the task is one, "One" is set in the Number of Target Hosts of Task field; if the number of target hosts of the task is plural, "Two or More" is set therein. Note that if there is no condition about the number of target hosts of the task, "-" is set therein. A program change rule is set in the Program Change Rule field. A program change rule refers to the type of a program change.

In the change rule table 400, a program change rule is uniquely determined by a combination of information set in the Host Name, Other Setting Items, and Number of Target Hosts of Task fields. For example, in rule information 400-1, "Different", "Different", and "-" are set in the Host Name, Other Setting Items, and Number of Target Hosts of Task fields, respectively. Accordingly, "Generation of Subtask" is decided as "Program Change Rule".

Example of Functional Configuration of Change Apparatus 101

Figure 5:
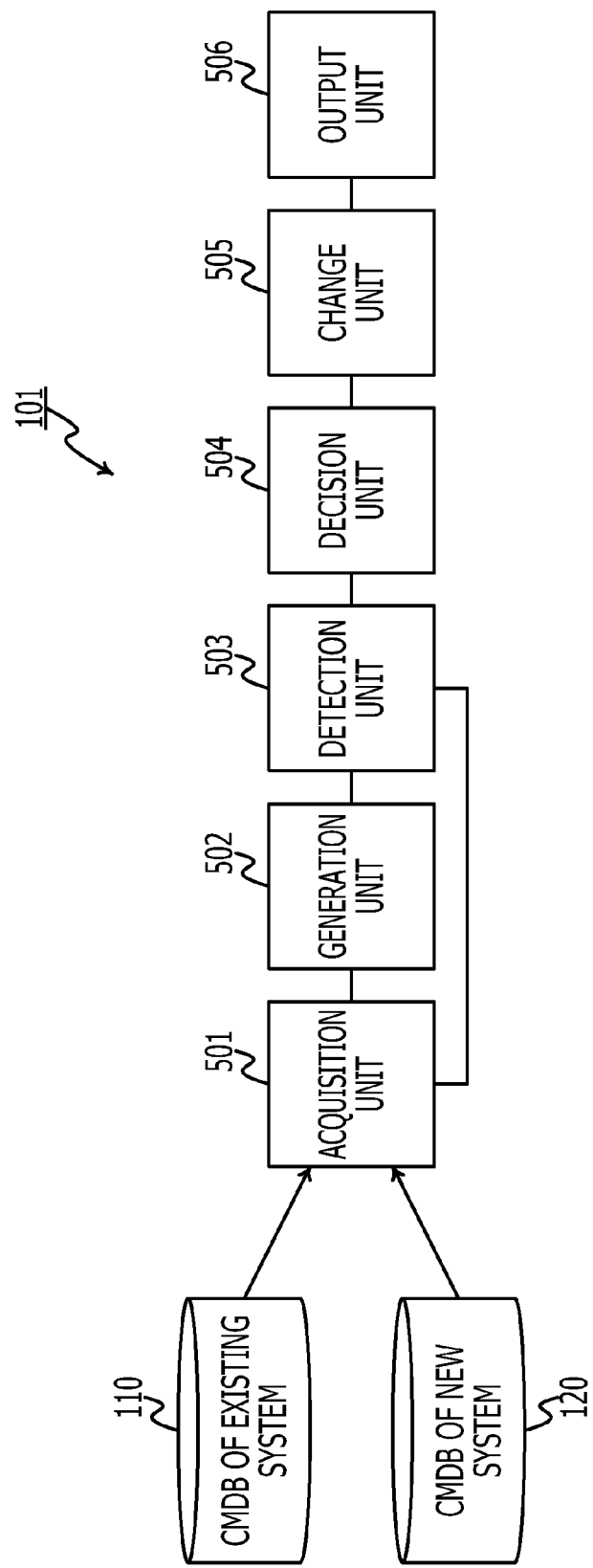
FIG. 5 illustrates an example of the functional configuration of a change apparatus.

FIG. 5 illustrates an example of the functional configuration of the change apparatus 101. In FIG. 5, the change apparatus 101 includes an acquisition unit 501, a generation unit 502, a detection unit 503, a decision unit 504, a change unit 505, and an output unit 506. Specifically, these function units are achieved either by causing the CPU 201 to execute a program stored in a storage device such as the ROM 202, RAM 203, or magnetic disk 205 shown in FIG. 2, or through the I/F 206. The results of processes performed by these function units are stored in a storage device such as the RAM 203 or magnetic disk 205.

The acquisition unit 501 has a function of acquiring the program P applied to the information processing apparatus EM of the existing system. The information processing apparatus EM is one of information processing apparatuses in the existing system. The program P is a program which runs on the existing system and is used, for example, to log in to the information processing apparatus EM of the existing system and to execute commands thereon.

For example, when the user performs an input operation using the keyboard 208 or mouse 209, the acquisition unit 501 acquires the program P applied to the information processing apparatus EM of the existing system. Alternatively, the acquisition unit 501 may acquire the program P applied to the information processing apparatus EM of the existing system from another computer through the network 210.

The acquisition unit 501 also has a function of acquiring configuration information of the information processing apparatus EM of the existing system from the CMDB 110 of the existing system. For example, the acquisition unit 501 acquires the configuration information 311 of the information processing apparatus EM of the existing system from the CMDB 110 by selecting the host name "SystemA-sv1" of the information processing apparatus EM.

The acquisition unit 501 also has a function of acquiring configuration information of the information processing apparatus NM of the new system from the CMDB 120 of the new system. For example, the acquisition unit 501 acquires the configuration information 312 of the information processing apparatus NM of the new system corresponding to the acquired configuration information 311 of the information processing apparatus EM of the existing system from the CMDB 120 of the new system. Note that respective sets of configuration information of the corresponding information processing apparatuses between the systems are previously associated with each other.

The generation unit 502 has a function of generating difference information D representing the difference between the configuration information of the information processing apparatus EM of the existing system and the configuration information of the information processing apparatus NM of the new system. For example, the generation unit 502 generates difference information 301 by comparing the configuration information 311 of the information processing apparatus EM of the existing system with the configuration information 312 of the information processing apparatus NM of the new system. The difference information D generated is stored, for example, in the difference information list DL shown in FIG. 3.

The detection unit 503 has a function of detecting the block of a process corresponding to the acquired difference information D of the blocks of the processes described in the program P applied to the information processing apparatus EM of the existing system. Hereafter, the block of the process corresponding to the difference information D of the blocks of the processes described in the program P may be referred to as "the block bk of the task T".

For example, the detection unit 503 refers to the difference information D and then sets, as a keyword, the value of a setting item in the configuration information of the information processing apparatus EM of the existing system which differs from the value of a corresponding setting item in the configuration information of the information processing apparatus NM of the new system. The detection unit 503 then detects the block bk of a task k including the keyword from the program P applied to the information processing apparatus EM of the existing system. Details of the process performed by the detection unit 503 will be described later with reference to FIG. 6 and the like.

The decision unit 504 has a function of deciding a change type to be applied to the detected block bk of the task T based on details of the difference information D. Specifically, the decision unit 504 refers to the change rule table 400 shown in FIG. 4 and then decides a program change rule to be applied to the block bk of the task T based on the details of the difference information D.

More specifically, first, the decision unit 504 determines whether the information processing apparatuses EM and NM of the existing and new systems differ from each other in the value of a particular setting item of the multiple setting items set on these information processing apparatuses, based on the difference information D. As used herein, the particular setting item refers to information uniquely identifying an information processing apparatus in a system and is, for example, the host name (hosts), IP address, or the like of the information processing apparatus. In the following description, assume that "Host Name (Hosts)" is the particular setting item.

The decision unit 504 then determines whether the information processing apparatuses EM and NM differ from each other in the value of any setting item other than the host name of the multiple setting items. Examples of the other setting items include a user name (User) using the information processing apparatus, a password for logging in to the information processing apparatus, an operating condition (Maintenance Mode, Cluster) of the information processing apparatus, a path of a file, folder, or the like, and a parameter of a command to be used.

If the information processing apparatuses EM and NM differ from each other in the value of the host name and if these information processing apparatuses also differ from each other in the value of any other setting item, the decision unit 504 refers to the change rule table 400 and then decides "Generation of Subtask" as a program change rule. "Generation of Subtask" refers to a change type which generates a task different from the task T. Hereafter, a task different from the task T may be referred to as "a subtask ST".

If the information processing apparatuses EM and NM differ from each other in the value of the host name and if these information processing apparatuses are the same in the values of the other setting items, the decision unit 504 refers to the change rule table 400 and then decides "Replacement of Host Name" as a program change rule. "Replacement of Host Name" refers to a change type which replaces the value of the host name in the block bk of the task T.

Alternatively, if the information processing apparatuses EM and NM are the same in the value of the host name, the decision unit 504 may refer to the block bk of the task T and then determine whether the number of targets of the task T is plural. The fact that the number of targets of the task T is plural means that the task T is performed on multiple information processing apparatuses.

Figure 6:
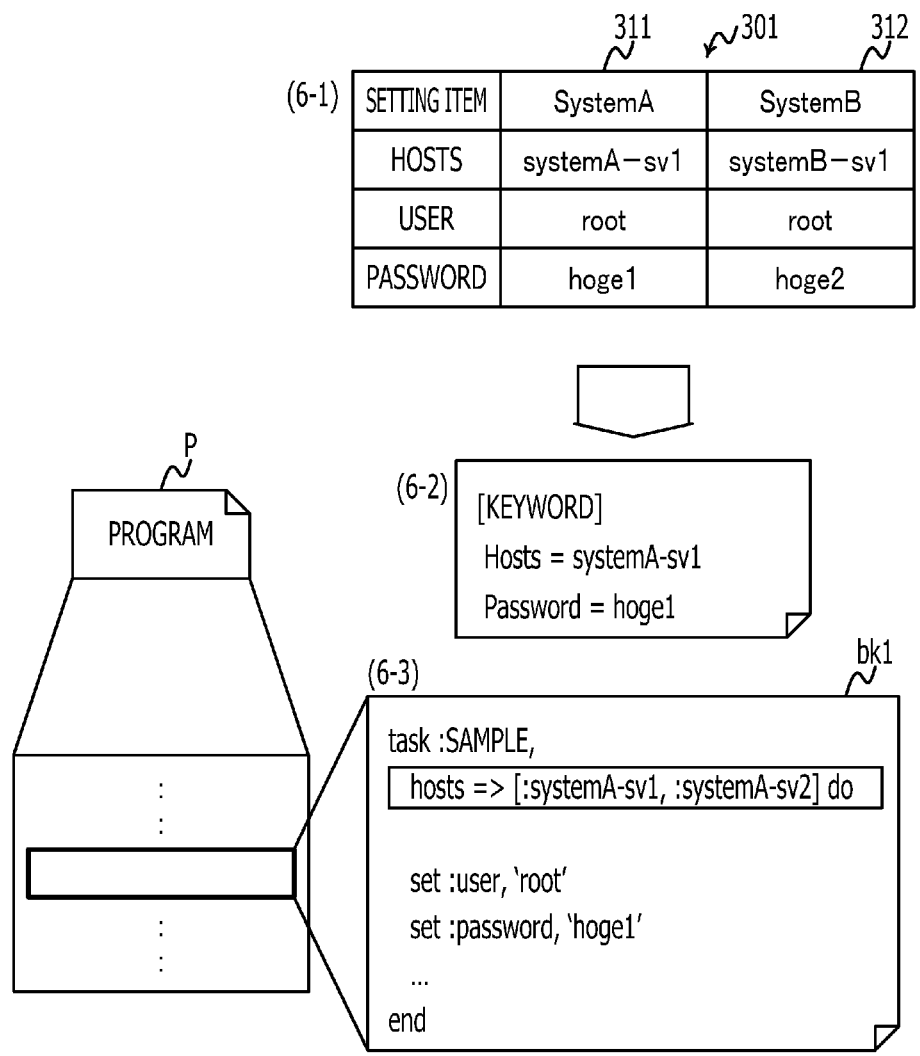
FIG. 6 illustrates a first example of a change to a program.

The number of targets of the task T is determined, for example, by the number of the host names described in [ ] of "hosts=>[ ]do" included in the block bk1 of the task T as shown in FIG. 6 (to be discussed later). In an example of FIG. 6, the number of targets of the task T is "2".

If the number of targets of the task T is plural, the decision unit 504 refers to the change rule table 400 and then decides "Generation of Subtask" as a program change rule. In contrast, if the number of targets of the task T is single, the decision unit 504 refers to the change rule table 400 and then decides "Replacement of Setting Item" as a program change rule. "Replacement of Setting Item" refers to a change type which replaces the value of another setting item in the block bk of the task T.

The change unit 505 has a function of changing the program P based on the program change rule decided. For example, if "Generation of Subtask" is decided as a program change rule, the change unit 505 first generates the block bk of a subtask ST by replicating the block bk of the task T.

Then the change unit 505 refers to the difference information D and then replaces the values of the setting items in the block bk of the subtask ST with the values of the setting items on the information processing apparatus NM of the new system. Alternatively, the change unit 505 may replace only the value of a setting item representing the difference between the configuration information of the information processing apparatus EM of the existing system and the configuration information of the information processing apparatus NM of the new system, of the values of the setting items in the block bk of the subtask ST.

Then the change unit 505 deletes the value of the host name of the information processing apparatus EM of the existing system in the block bk of the task T, as well as inserts a description for calling the subtask ST into the block bk of the task T. In this way, a program P to be applied to the information processing apparatus NM of the new system is generated from the program P applied to the information processing apparatus EM of the existing system.

Note that the block bk of the subtask ST may be generated as a file different from the program P as long as the subtask ST can be called from the task T, or may be inserted into the program P. If the block bk of the subtask ST is generated as a different file, an increase in the amount of description in the program P is suppressed, so that a debug operation is efficiently performed.

For example, if "Replacement of Host Name" is decided as a program change rule, the change unit 505 replaces the value of the host name of the information processing apparatus EM in the block bk of the task T with the value of the host name of the information processing apparatus NM. Thus, the block bk of the task T is changed so as to be applicable to the information processing apparatus NM of the new system.

For example, if "Replacement of Setting Item" is decided as a program change rule, the change unit 505 replaces the value of another setting item of the information processing apparatus EM in the block bk of the task T with the value of a corresponding setting item of the information processing apparatus NM. Thus, the block bk of the task T is changed so as to be applicable to the information processing apparatus NM of the new system.

If an operating condition is set on the information processing apparatus NM of the new system, the change unit 505 may insert a conditional statement about the operating condition into the block bk of the subtask ST. As used herein, an operating condition refers to a condition for causing thee information processing apparatus NM of the new system to perform or not to perform the subtask ST.

Examples of the operating condition include a condition for causing the information processing apparatus NM not to perform the subtask ST when the information processing apparatus NM is placed in a maintenance state. Another example is a condition for causing the information processing apparatus NM not to perform the subtask ST when the information processing apparatus NM is clustered (e.g., duplexed) with another information processing apparatus and when the other information processing apparatus is on.

The operating condition of the information processing apparatus NM of the new system is identified, for example, from configuration information (e.g., configuration information 812 shown in FIG. 8 to be discussed later) of the information processing apparatus NM of the new system. An example of a change to be made to the program P in a case where an operating condition is set on the information processing apparatus NM of the new system will be described later with reference to FIGS. 9 and 10.

When applying the program P to both the information processing apparatuses EM and NM of the existing and new systems, the change unit 505 may determine whether there are sets of definition information df about the information processing apparatuses EM and NM. In this case, the user makes a selection on whether to apply the program P to both the information processing apparatus EM and NM of the existing and new systems by performing an input operation using the keyboard 208 or mouse 209. The sets of definition information df define the values of the setting items set on the information processing apparatuses EM and NM.

For example, the definition information df about the information processing apparatus EM is stored in the CMDB 110 of the existing system in such a manner to be associated with the configuration information of the information processing apparatus EM. Similarly, the definition information df about the information processing apparatus NM is stored in the CMDB 120 of the new system in such a manner to be associated with the configuration information of the information processing apparatus NM. A specific example of the sets of definition information df about the information processing apparatuses EM and NM will be described later with reference to FIG. 18.

If there are respective sets of definition information df about the information processing apparatuses EM and NM, the change unit 505 may change the program P based on the sets of definition information df about the information processing apparatuses EM and NM. An example of a change to the program P based on the sets of definition information df about the information processing apparatuses EM and NM will be described later with reference to FIG. 19.

If there are no sets of definition information df about the information processing apparatuses EM and NM, the decision unit 504 decides a change type to be applied to the detected block bk of the task T based on details of the difference information D. An example of a change to the program P in a case where there are no sets of definition information df about the information processing apparatuses EM and NM will be described later with reference to FIGS. 15 and 16.

The output unit 506 has a function of outputting the program P changed by the change unit 505. Thus, the program P which has the same functions as the program P running on the existing system and which is to run on the new system is outputted.

The output unit 506 may output the decision result. For example, the output unit 506 may associate the program change rule to be applied to the block bk of the task T with information (e.g., task name) identifying the task T included in the program P and then output the program change rule.

The output unit 506 outputs the changed program P, for example, in one of the following manners: storage in a storage device such as the RAM 203 or magnetic disk 205; display on the display 207; output to a printer (not shown); or transmission to an external computer through the I/F 206.

While the difference information D representing the difference between the configuration information of the information processing apparatus EM of the existing system and the configuration information of the information processing apparatus NM of the new system is generated in the above description, the difference information D may be acquired in other manners. For example, the acquisition unit 501 may acquire difference information D generated by another computer.

Example of Change to Program P

Next, an example of a change to the program P will be described. First, an example of a change to the program P in a case where "Generation of Subtask" is decided as a program change rule will be described.

First Example of Change

Figure 7:
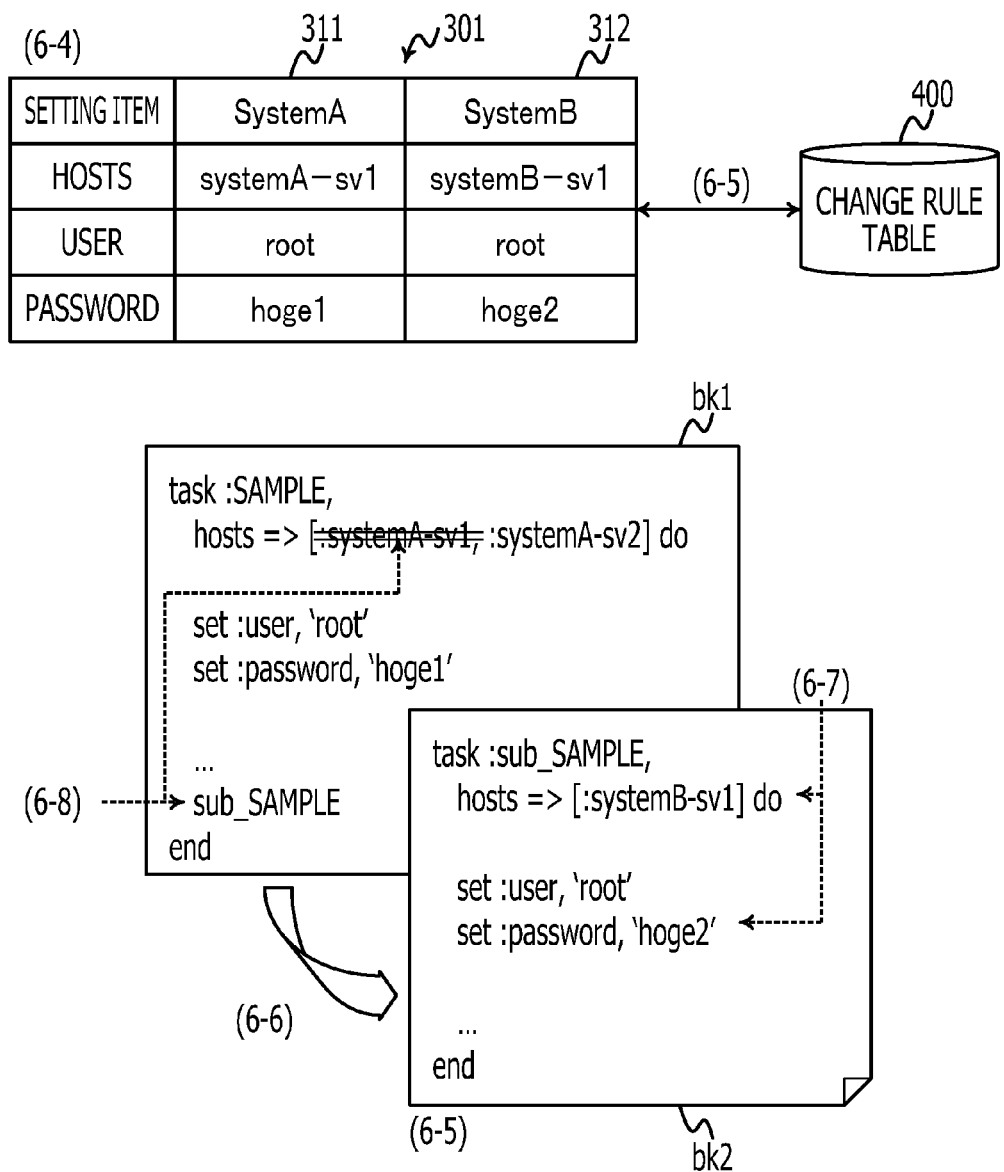
FIG. 7 illustrates the first example of a change to the program.

FIGS. 6 and 7 illustrate a first example of a change to the program P. In (6-1) of FIG. 6, the detection unit 503 selects difference information D from the difference information list DL. In this example, assume that the detection unit 503 selects the difference information 301 shown in FIG. 3 as the difference information D.

In (6-2) of FIG. 6, the detection unit 503 refers to the selected difference information 301 and then sets, as keywords, the values of setting items in the configuration information 311 of the information processing apparatus EM of the existing system which differ from the values of the corresponding setting items of the configuration information 312 of the information processing apparatus NM of the new system. In this example, "Hosts=systemA-sv1" and "Password=hoge1" are set as keywords.

In (6-3) of FIG. 6, the detection unit 503 detects the block bk of a task T including the keywords from the program P applied to the information processing apparatus EM of the existing system. In this example, assume that a block bk1 of a task T with a task name "SAMPLE" is detected. The detected block bk1 of the task T is the target to be changed.

In (6-4) of FIG. 7, the decision unit 504 refers to the difference information 301 and then determines whether the information processing apparatuses EM and NM differ from each other in the value of Host Name (Hosts). Since the Host Name values are "systemA-sv1" and "systemB-sv1", respectively, the decision unit 504 determines that the information processing apparatuses EM and NM differ from each other in the value of Host Name (Hosts).

The decision unit 504 also refers to the difference information 301 and then determines whether the information processing apparatuses EM and NM differ from each other in the value of any setting item other than the host name. Since the Password values are "hoge1" and "hoge2", respectively, the decision unit 504 determines that the information processing apparatuses EM and NM also differ from each other in the value of this setting item.

In (6-5) of FIG. 7, the decision unit 504 refers to the change rule table 400 and then decides a program change rule to be applied to the block bk1 of the task T, based on the determination results. In this case, "Generation of Subtask" is decided as a program change rule.

In (6-6) of FIG. 7, the change unit 505 generates the block bk of a subtask ST by replicating the block bk1 of the task T. In this case, a block bk2 of a subtask ST with a task name "sub_SAMPLE" is generated.

In (6-7) of FIG. 7, the change unit 505 refers to the difference information 301 and then replaces the value of the setting items in the block bk2 of the subtask ST with the values of the setting items of the information processing apparatus NM of the new system. Specifically, the Host Name (Hosts) value of the target information processing apparatus described in the block bk2 of the subtask ST, "systemA-sv1, systemA-sv2" is replaced with "system B-sv1".

Also, the Password value described in the block bk2 of the subtask ST, "hoge1", is replaced with "hoge2". As a result, the block bk2 of the subtask ST being applied to the information processing apparatus NM (host name: SystemB-sv1) of the new system is made. Note that in the program P, the Host Name (Hosts) value of the target information processing apparatus of the task T (or subtask ST) is described in [] of "hosts=>[ ]do".

In (6-8) of FIG. 7, the change unit 505 deletes the value "SystemA-sv1" of the host name of the information processing apparatus EM of the existing system in the block bk1 of the task T. The change unit 505 also inserts a code "sub_SAMPLE" for calling the subtask ST into the block bk1 of the task T. Thus, when executing the task T, the subtask ST is called and executed.

If the detection unit 503 selects difference information 302 as the difference information D, the decision unit 504 decides "Replacement of Host Name" as a program change rule in the above (6-5). In this case, the change unit 505 replaces the value "SystemA-sv1" of the host name of the information processing apparatus EM in the block bk of the task T with the value "SystemB-sv 1" of the host name of the information processing apparatus NM. Thus, the block bk1 of the task T with the task name "SAMPLE" is changed in such a manner to be applicable to the information processing apparatus NM of the new system.

Second Example of Change

Next, there will be described an example of a change to the program P in a case where an operating condition is set on the information processing apparatus NM of the new system. If no operating condition is set on the information processing apparatus EM of the existing system, a description on the operating condition of the information processing apparatus EM is often omitted in the program P. For this reason, if a new operating condition is set on the information processing apparatus NM of the new system, it is difficult to generate a program P to be applied to the information processing apparatus NM of the new system by simply replacing a parameter value depending on the system environment. Hereafter, first, there will be described an example of a change to the program P in a case where the information processing apparatus NM of the new system is placed in a maintenance mode.

Figure 8:
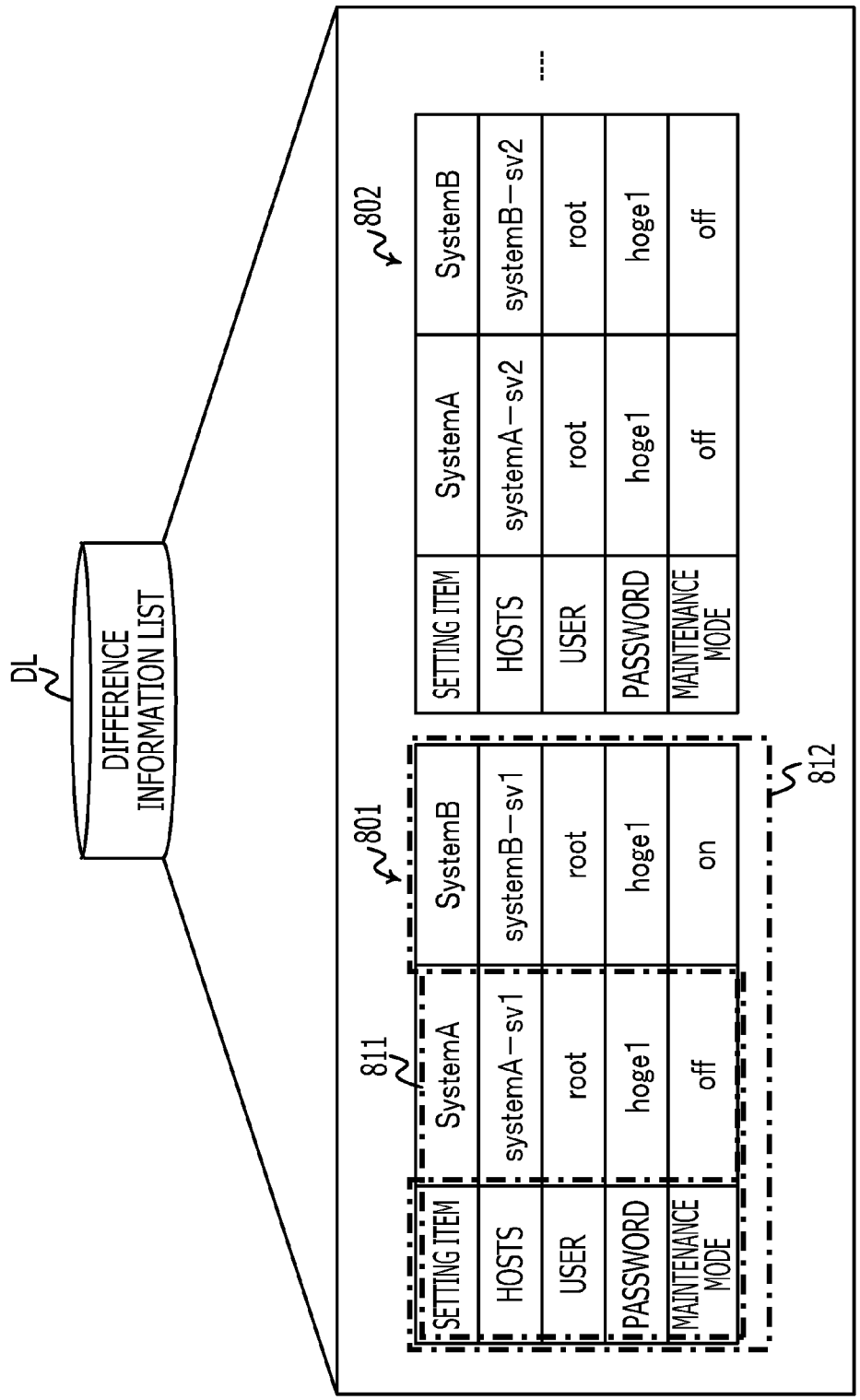
FIG. 8 illustrates an example of the contents of a difference information list.

FIG. 8 illustrates an example of the contents of a difference information list DL. In FIG. 8, the difference information list DL includes difference information 801 and difference information 802. For example, the difference information 801 is information representing the difference between configuration information 811 of the information processing apparatus EM of the existing system and configuration information 812 of the information processing apparatus NM of the new system.

The configuration information 811 of the information processing apparatus EM of the existing system includes a host name "systemA-sv1", a user name "root", a password "hoge1", and a maintenance mode "off".

The configuration information 812 of the information processing apparatus NM of the new system includes a host name "systemB-sv1", a user name "root", a password "hoge1", and a maintenance mode "on". The configuration information 811 of the information processing apparatus EM of the existing system and the configuration information 812 of the information processing apparatus NM of the new system differ from each other in host name and maintenance mode.

Figure 9:
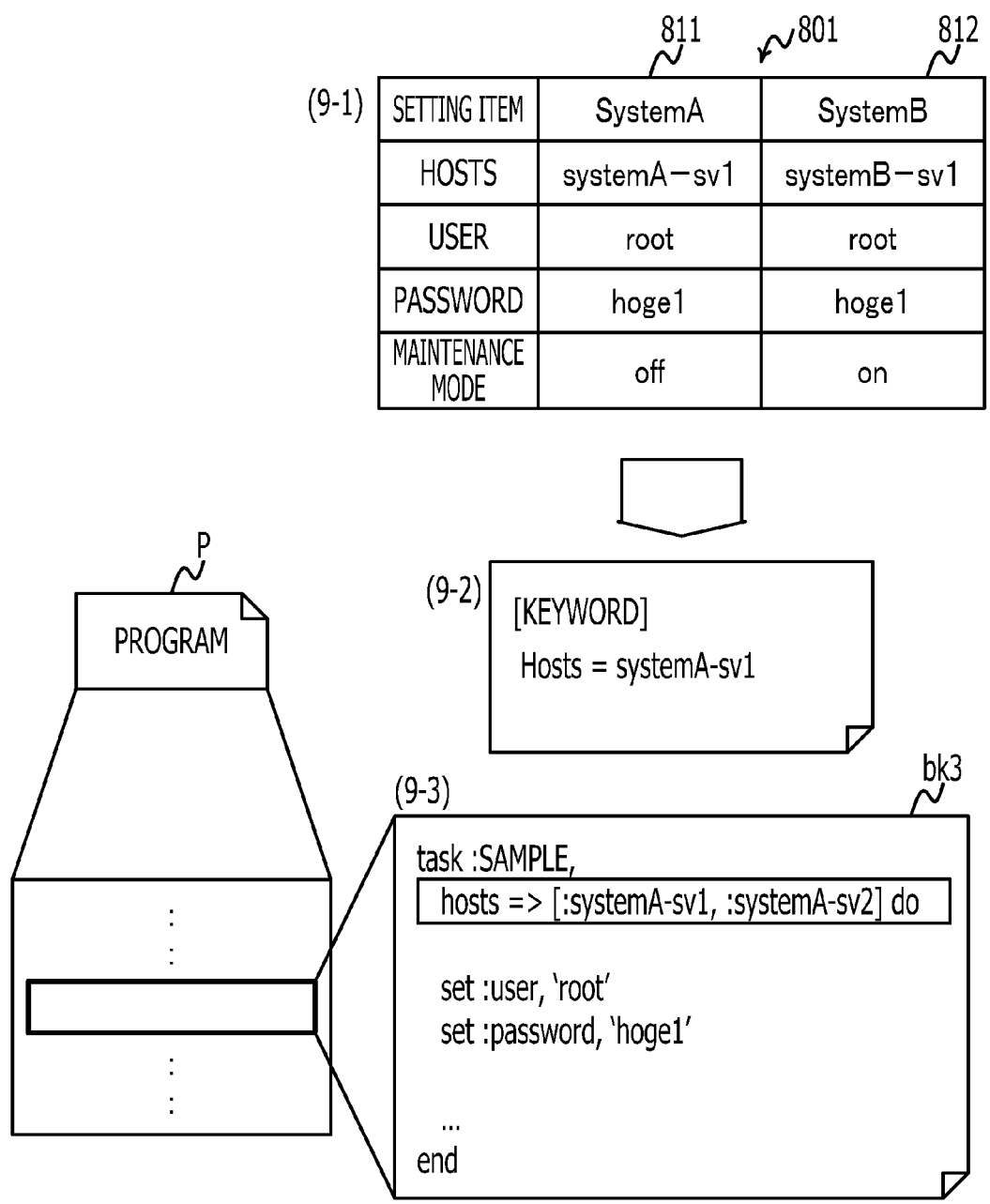
FIG. 9 illustrates a second example of a change to the program.
Figure 10:
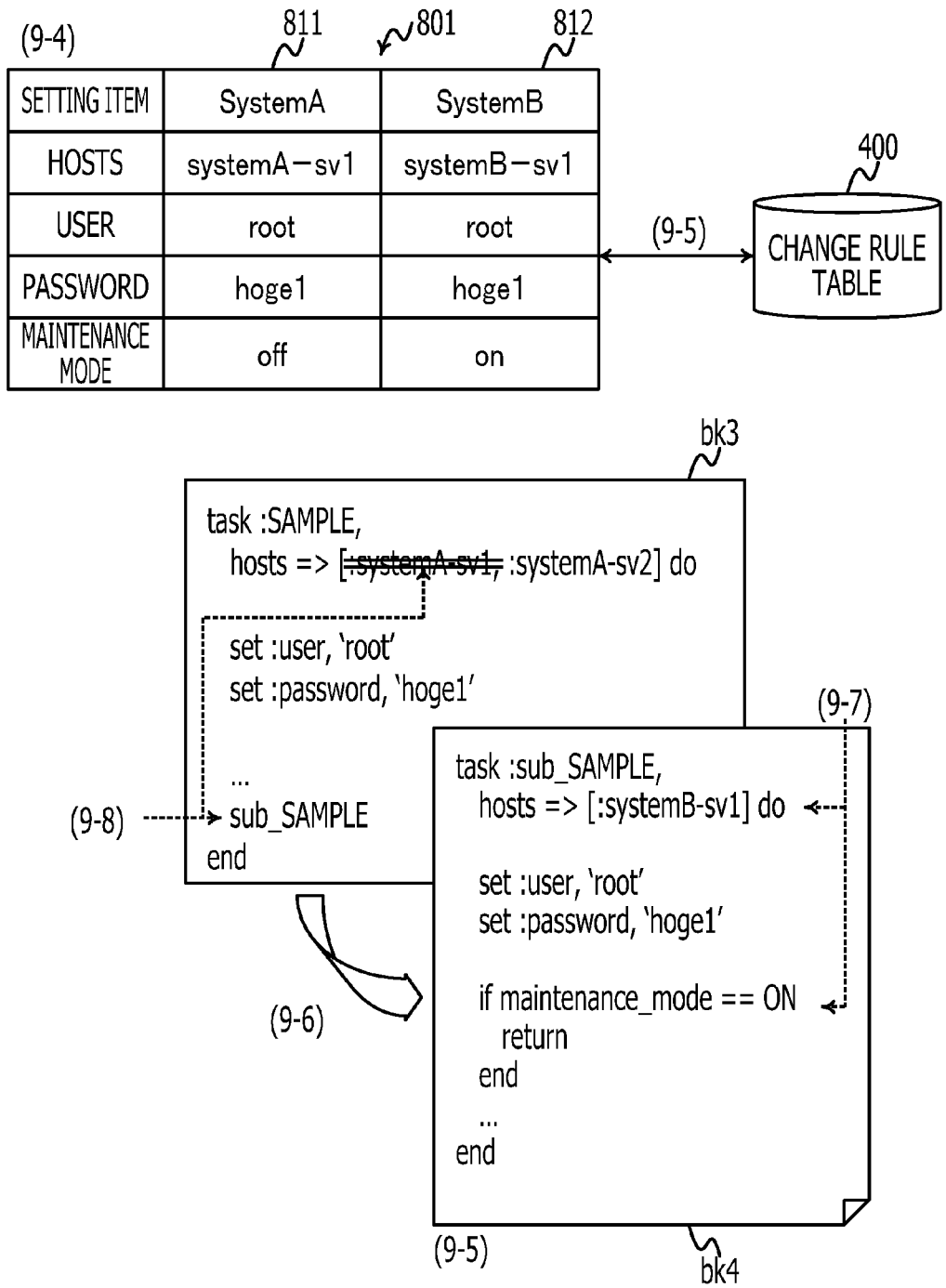
FIG. 10 illustrates the second example of a change to the program.

FIGS. 9 and 10 illustrate a second example of a change to the program P. In (9-1) of FIG. 9, the detection unit 503 selects difference information D from the difference information list DL. In this example, assume that the detection unit 503 selects the difference information 801 shown in FIG. 8 as the difference information D.

In (9-2) of FIG. 9, the detection unit 503 refers to the selected difference information 801 and then sets, as a keyword, the value of a setting item in the configuration information 811 of the information processing apparatus EM of the existing system which differs from the value of the corresponding setting item in the configuration information 812 of the information processing apparatus NM of the new system. In this case, the detection unit 503 sets "Hosts=systemA-sv1" as a keyword.

As described above, a description on the operating condition of the information processing apparatus EM of the existing system may be omitted in the program P (e.g., when maintenance mode is off, etc.). For this reason, the value of the operating condition does not necessarily have to be set as a keyword. In this example, assume that an operating condition value "Maintenancemode=off" is not set as a keyword.

In (9-3) of FIG. 9, the detection unit 503 then detects the block bk of a task k including the keyword from the program P applied to the information processing apparatus EM of the existing system. In this example, assume that the detection unit 503 detects a block bk3 of a task T with a task name "SAMPLE". The detected block bk3 of the task T is the target to be changed.

In (9-4) of FIG. 10, the decision unit 504 refers to the difference information 801 and then determines whether the information processing apparatuses EM and NM differ from each other in the value of Host Name (Hosts). Since the Host Name values are "systemA-sv1" and "systemB-sv1", respectively, the decision unit 504 determines that the information processing apparatuses EM and NM differ from each other in the value of Host Name (Hosts).

The decision unit 504 then refers to the difference information 801 and then determines whether the information processing apparatuses EM and NM differ from each other in the value of any setting item other than the host name. Since the Maintenance Mode values are "off" and "on", respectively, the decision unit 504 determines that the information processing apparatuses EM and NM differ from each other in the value of this setting item.

In (9-5) of FIG. 10, the decision unit 504 refers to the change rule table 400 and then decides a program change rule to be applied to the block bk3 of the task T based on the determination result. In this example, the detection unit 503 decides "Generation of Subtask" as a program change rule.

In (9-6) of FIG. 10, the change unit 505 generates a block bk of a subtask ST by replicating the block bk3 of the task T. In this case, the decision unit 504 generates a block bk4 of a subtask ST with a task name "sub_SAMPLE".

In (9-7) of FIG. 10, the change unit 505 refers to the difference information 801 and then replaces the value of a setting item in the block bk4 of the subtask ST with the value of the corresponding setting item of the information processing apparatus NM of the new system. Specifically, the Host Name (Hosts) value of the target information processing apparatus described in the block bk4 of the subtask ST, "systemA-sv1, systemA-sv2", is replaced with "systemB-sv1".

The change unit 505 also inserts a conditional statement about the operating condition of the information processing apparatus NM into the block bk4 of the subtask ST. For example, the change unit 505 refers to the difference information 801 and then inserts a conditional statement "if maintenance_mode==ON return" into the block bk4 of the subtask ST.

The resulting block bk4 of the subtask ST is applied to the information processing apparatus NM (host name: SystemB-sv1) of the new system. Note that if the information processing apparatus NM is placed in a maintenance state, the change apparatus 101 may cause the information processing apparatus NM not to execute the subtask ST.

In (9-8) FIG. 10, the change unit 505 deletes the value "SystemA-sv 1" of the host name of the information processing apparatus EM of the existing system in the block bk3 of the task T. The change unit 505 also inserts a code "sub_SAMPLE" for calling the subtask ST into the block bk3 of the task T. Thus, when executing the task T, the subtask ST is called and executed.

Third Example of Change

Next, there will be described an example of a change to the program P in a case where clustering is set on the information processing apparatus NM of the new system.

Figure 11:
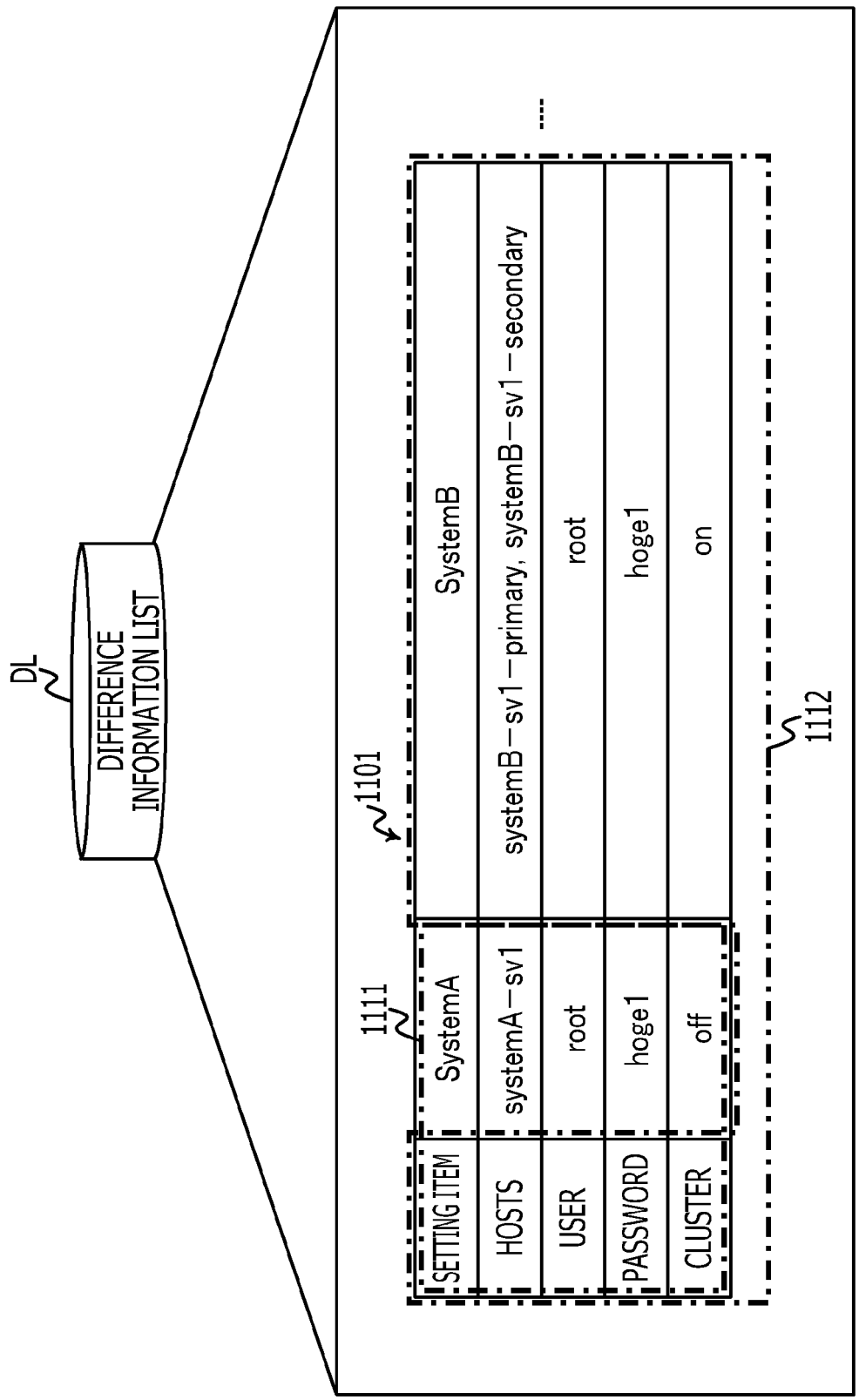
FIG. 11 illustrates an example of the contents of a difference information list.

FIG. 11 illustrates an example of the contents of a difference information list DL. In FIG. 11, the difference information list DL includes difference information 1101. For example, the difference information 1101 is information representing the difference between configuration information 1111 of the information processing apparatus EM of the existing system and configuration information 1112 of the information processing apparatus NM of the new system.

The configuration information 1111 of the information processing apparatus EM of the existing system includes a host name "systemA-sv1", a user name "root", a password "hoge1", and clustering "off".

The configuration information 1112 of the information processing apparatus NM of the new system includes a host name "systemB-sv1 -primary,systemB-sv1-secondary", a user name "root", a password "hoge1", and clustering "on". In this case, the configuration information 1111 of the information processing apparatus EM of the existing system and the configuration information 1112 of the information processing apparatus NM of the new system differ from each other in host name and clustering.

Figure 12:
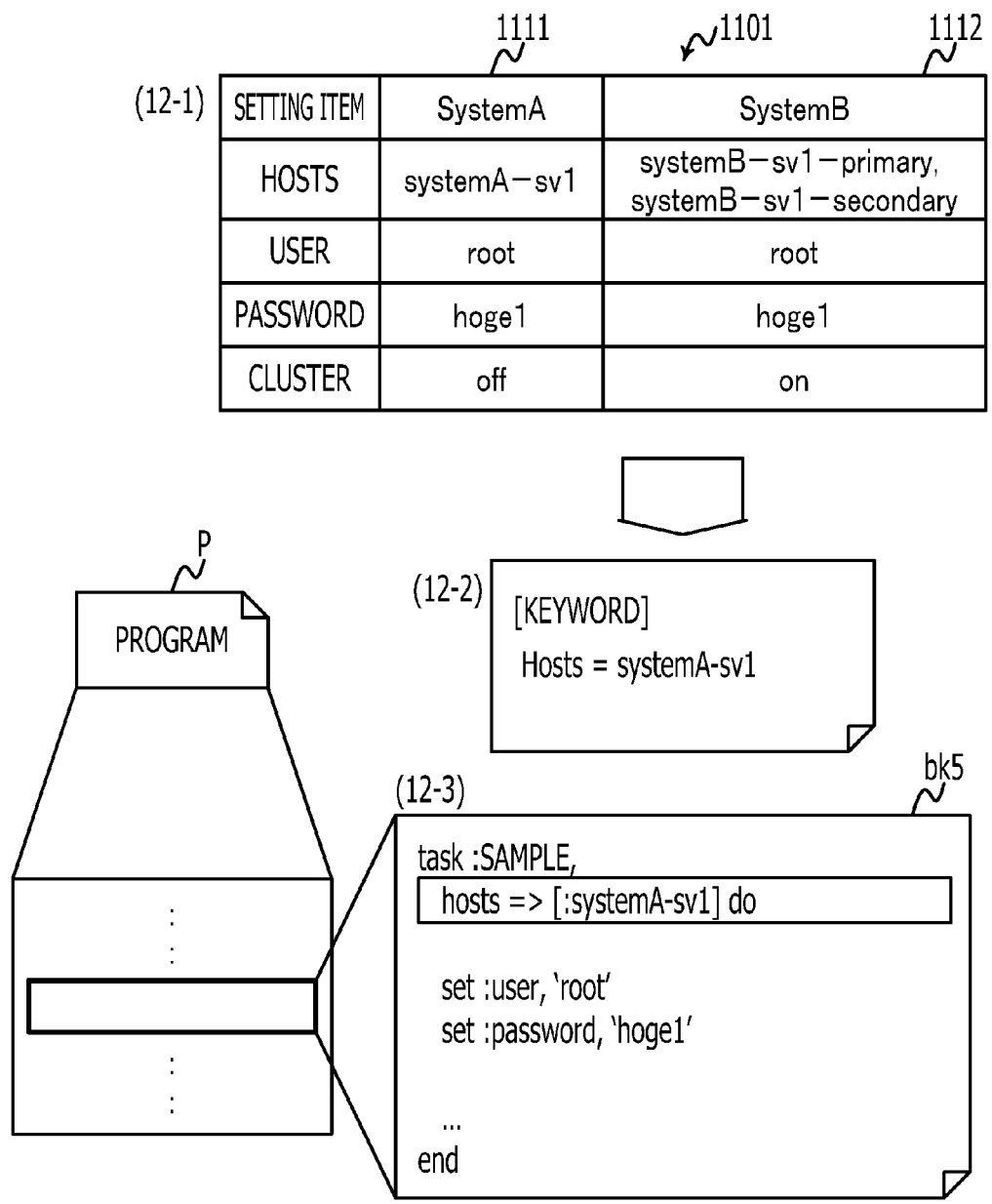
FIG. 12 illustrates a third example of a change to the program.

FIGS. 12 and 13 illustrate a third example of a change to the program P. In (12-1) of FIG. 12, the detection unit 503 selects difference information D from the difference information list DL. In this example, assume that the detection unit 503 selects the difference information 1101 shown in FIG. 11 as the difference information D.

In (12-2) of FIG. 12, the detection unit 503 refers to the selected difference information 1101 and then sets, as a keyword, the value of a setting item in the configuration information 1111 of the information processing apparatus EM of the existing system which differs from the value of the corresponding setting item in the configuration information 1111 of the information processing apparatus NM of the new system. In this case, "Hosts=systemA-sv1" is set as a keyword.

As described above, a description on the operating condition of the information processing apparatus EM of the existing system may be omitted in the program P (e.g., when Cluster is off, etc.). In this example, assume that an operating condition value "Cluster=off" is not set as a keyword.

In (12-3) of FIG. 12, the detection unit 503 detects a block bk of a task k including the keyword from the program P applied to the information processing apparatus EM of the existing system. In this example, assume that the detection unit 503 detects a block bk5 of a task T with a task name "SAMPLE". The detected block bk5 of the task T is the target to be changed.

In (12-4) of FIG. 13, the decision unit 504 refers to the difference information 1101 and then determines whether the information processing apparatuses EM and NM differ from each other in the value of Host Name (Hosts). Since the Host values are "systemA-sv1" and "systemB-sv1 -primary, systemB-sv1-secondary", respectively, the decision unit 504 determines that the information processing apparatuses EM and NM differ from each other in the value of Host Name (Hosts).

The decision unit 504 also refers to the difference information 1101 and then determines whether the information processing apparatuses EM and NM differ from each other in the value of any setting item other than the host name. Since the Cluster values are "off" and "on", respectively, the decision unit 504 determines that the information processing apparatuses EM and NM also differ from each other in the value of this setting item.

In (12-5) of FIG. 13, the decision unit 504 refers to the change rule table 400 and then decides a program change rule to be applied to the block bk5 of the task T based on the determination result. In this example, the decision unit 504 decides "Generation of Subtask" as a program change rule.

In (12-6) of FIG. 13, the change unit 505 generates a block bk of a subtask ST by replicating the block bk5 of the task T. In this case, a block bk6 of a subtask ST with a task name "sub_SAMPLE" is generated.

In (12-7) of FIG. 13, the change unit 505 replaces the value "SystemA-sv1" of the host name of the information processing apparatus EM of the existing system in block bk5 of the task T with the value "systemB-sv1-primary" of the host name of the information processing apparatus NM of the new system. The change unit 505 also inserts a code "if SystemB-sv1 -primary==POWER OFF sub_SAMPLE" for calling the subtask ST into the block bk5 of the task T. Thus, if the information processing apparatus NM with a host name "SystemB-sv1-primary" is off when executing the task T, the subtask ST is called and executed.

In (12-8) of FIG. 13, the change unit 505 refers to the difference information 1101 and then replaces the value of a setting item in the block bk6 of the subtask ST with the value of the corresponding setting item of the information processing apparatus NM of the new system. In this case, the Host Name (Hosts) value of the target information processing apparatus described in the block bk6 of the subtask ST, "systemA-sv1", is replaced with "systemB-sv1 -secondary".

The resulting block bk6 of the subtask ST is applied to the information processing apparatus NM (host name: systemB-sv1-secondary) of the new system.

Fourth Example of Change

Next, there will be described an example of a change to the program P in a case where the program P is applied to both the information processing apparatuses EM and NM of the existing and new systems. First, there will be described a case where there are no sets of definition information df about the information processing apparatuses EM and NM.

Figure 14:
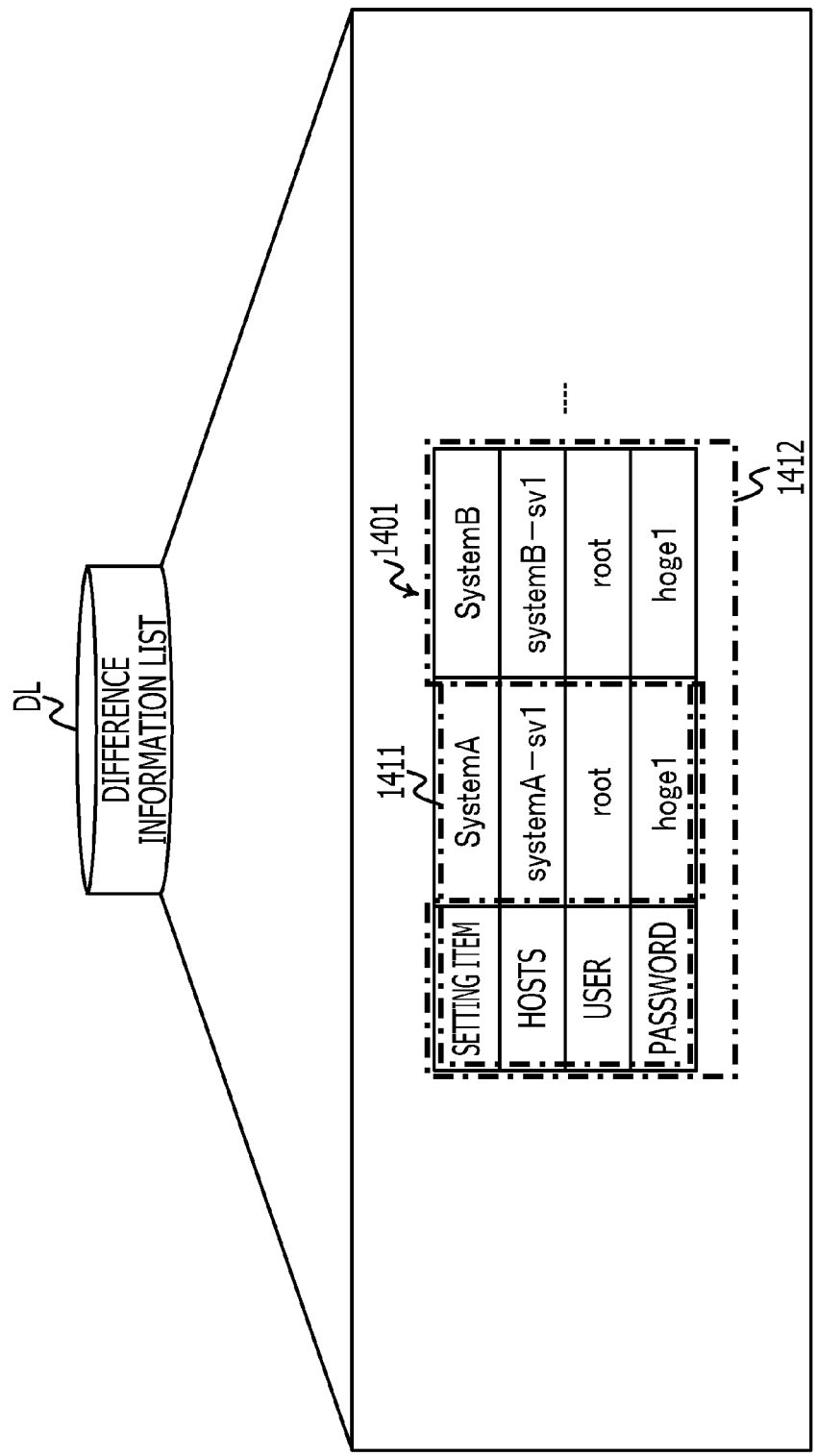
FIG. 14 illustrates an example of the contents of a difference information list.

FIG. 14 illustrates an example of the contents of a difference information list DL. In FIG. 14, the difference information list DL includes difference information 1401. For example, the difference information 1401 is information representing the difference between configuration information 1411 of the information processing apparatus EM of the existing system and configuration information 1412 of the information processing apparatus NM of the new system.

The configuration information 1411 of the information processing apparatus EM of the existing system includes a host name "systemA-sv1", a user name "root", and a password "hoge1". The configuration information 1412 of the information processing apparatus NM of the new system includes a host name "systemB-sv1", a user name "root", and a password "hoge1". The configuration information 1411 of the information processing apparatus EM of the existing system and the configuration information 1412 of the information processing apparatus NM of the new system differ from each other in host name.

Figure 15:
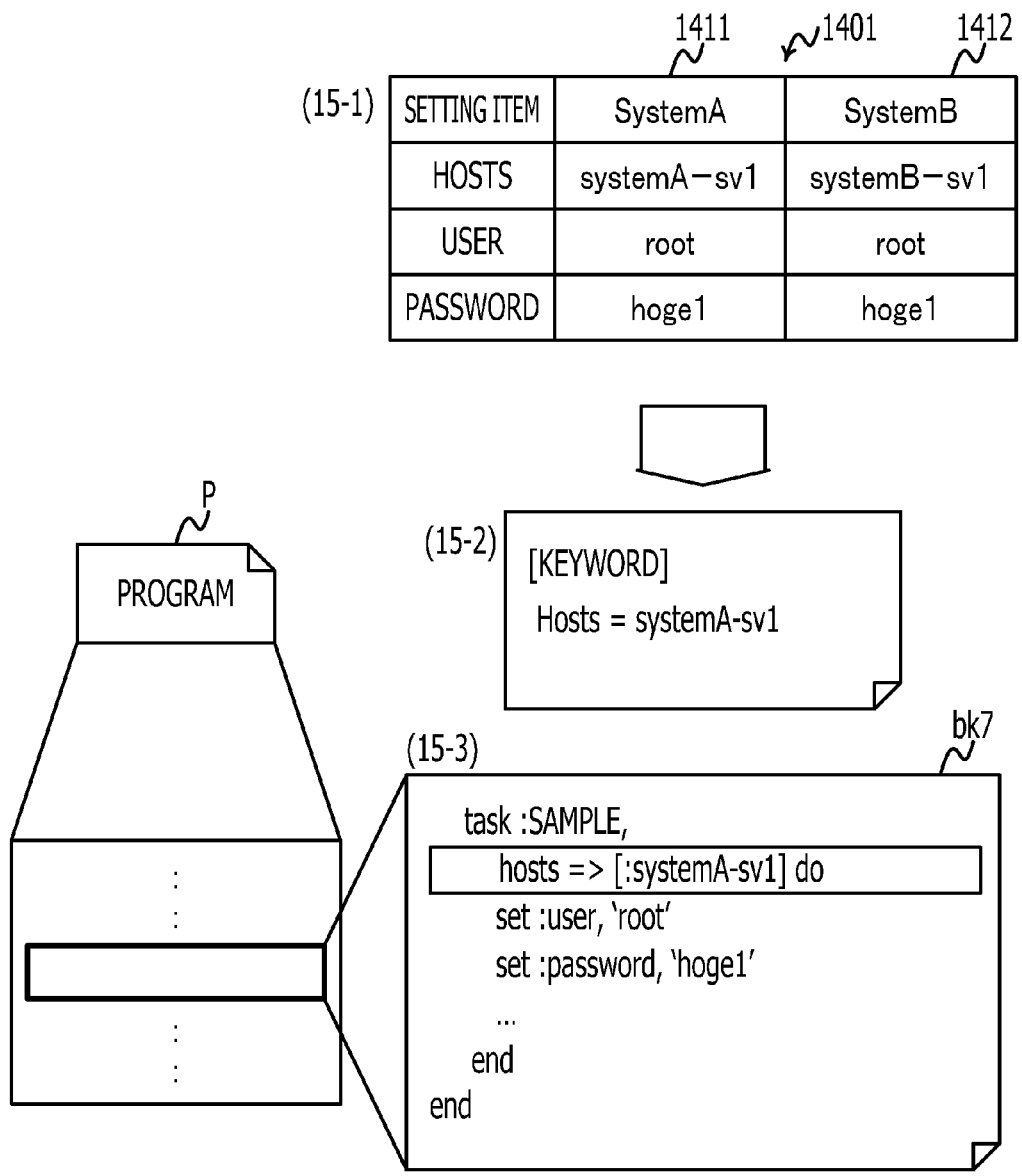
FIG. 15 illustrates a fourth example of a change to the program.
Figure 16:
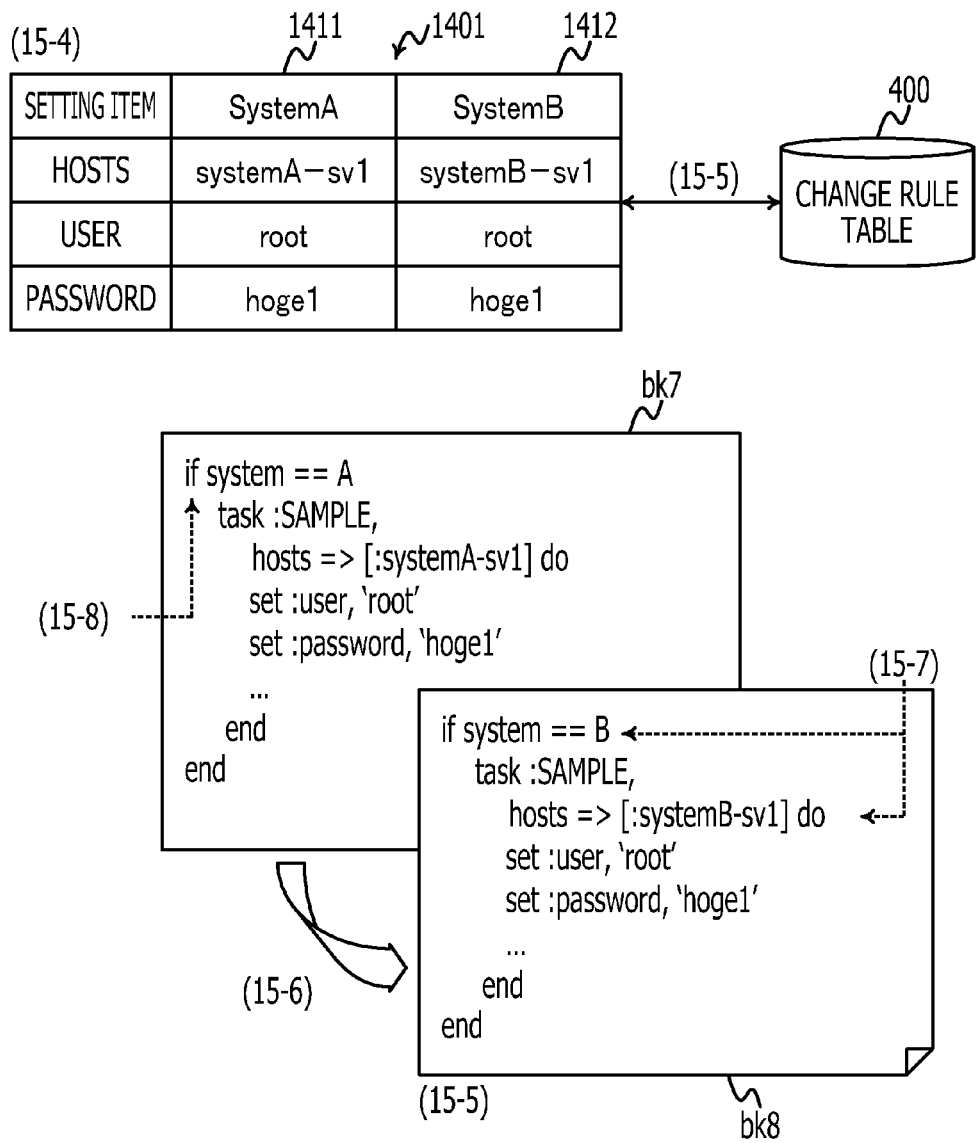
FIG. 16 illustrates the fourth example of a change to the program.

FIGS. 15 and 16 illustrate a fourth example of a change to the program P. In (15-1) of FIG. 15, the detection unit 503 selects difference information D from the difference information list DL. In this example, assume that the detection unit 503 selects the difference information 1401 shown in FIG. 14 as the difference information D.

In (15-2) of FIG. 15, the detection unit 503 refers to the selected difference information 1401 and then sets, as a keyword, the value of a setting item in the configuration information 1411 of the information processing apparatus EM of the existing system which differs from the value of the corresponding setting item in the configuration information 1412 of the information processing apparatus NM of the new system. In this case, "Hosts=systemA-sv1" is set as a keyword.

In (15-3) of FIG. 15, the detection unit 503 detects a block bk of a task k including the keyword from the program P applied to the information processing apparatus EM of the existing system. In this example, assume that the detection unit 503 detects a block bk7 of a task T with a task name "SAMPLE".

In (15-4) of FIG. 16, the decision unit 504 refers to the difference information 1401 and then determines whether the information processing apparatuses EM and NM differ from each other in the value of Host Name (Hosts). Since the Host Name values are "systemA-sv1" and "systemB-sv1", respectively, the decision unit 504 determines that the information processing apparatuses EM and NM differ from each other in the value of Host Name (Hosts).

The decision unit 504 also refers to the difference information 1401 and then determines whether the information processing apparatuses EM and NM differ from each other in the value of any setting item other than the host name. Since the values of each of the other setting items are the same, the decision unit 504 determines that the information processing apparatuses EM and NM are the same in the values of the other setting items.

In (15-5) of FIG. 16, the decision unit 504 refers to the change rule table 400 and then decides a program change rule to be applied to the block bk7 of the task T based on the determination result. In this case, "Generation of Subtask" is decided as a program change rule.

In (15-6) of FIG. 16, the change unit 505 generates a block bk of a subtask ST by replicating the block bk7 of the task T. In this case, the change unit 505 generates a block bk8 of a subtask ST with a task name "SAMPLE".

In (15-7) of FIG. 16, the change unit 505 refers to the difference information 1401 and then replaces the value of a setting item in the block bk8 of the subtask ST with the value of a corresponding setting item on the information processing apparatus NM of the new system. In this case, the Host Name (Hosts) value of the target information processing apparatus described in the block bk8 of the subtask ST, "systemA-sv1", is replaced with "systemB-sv1".

The change unit 505 also inserts, into the top of the block bk8 of the subtask ST, a conditional statement "if system==B" meaning that if the system is the new system (system B), the subtask ST is executed. Thus, when the new system runs the program P, the subtask ST with the task name "SAMPLE" is executed.

In (15-8) of FIG. 16, the change unit 505 also inserts, into the top of the block bk7 of the task T, a conditional statement "if system==A" meaning that if the system is the existing system (system A), the task T is executed. Thus, when the existing system runs the program P, the task T with the task name "SAMPLE" is executed.

Figure 17:
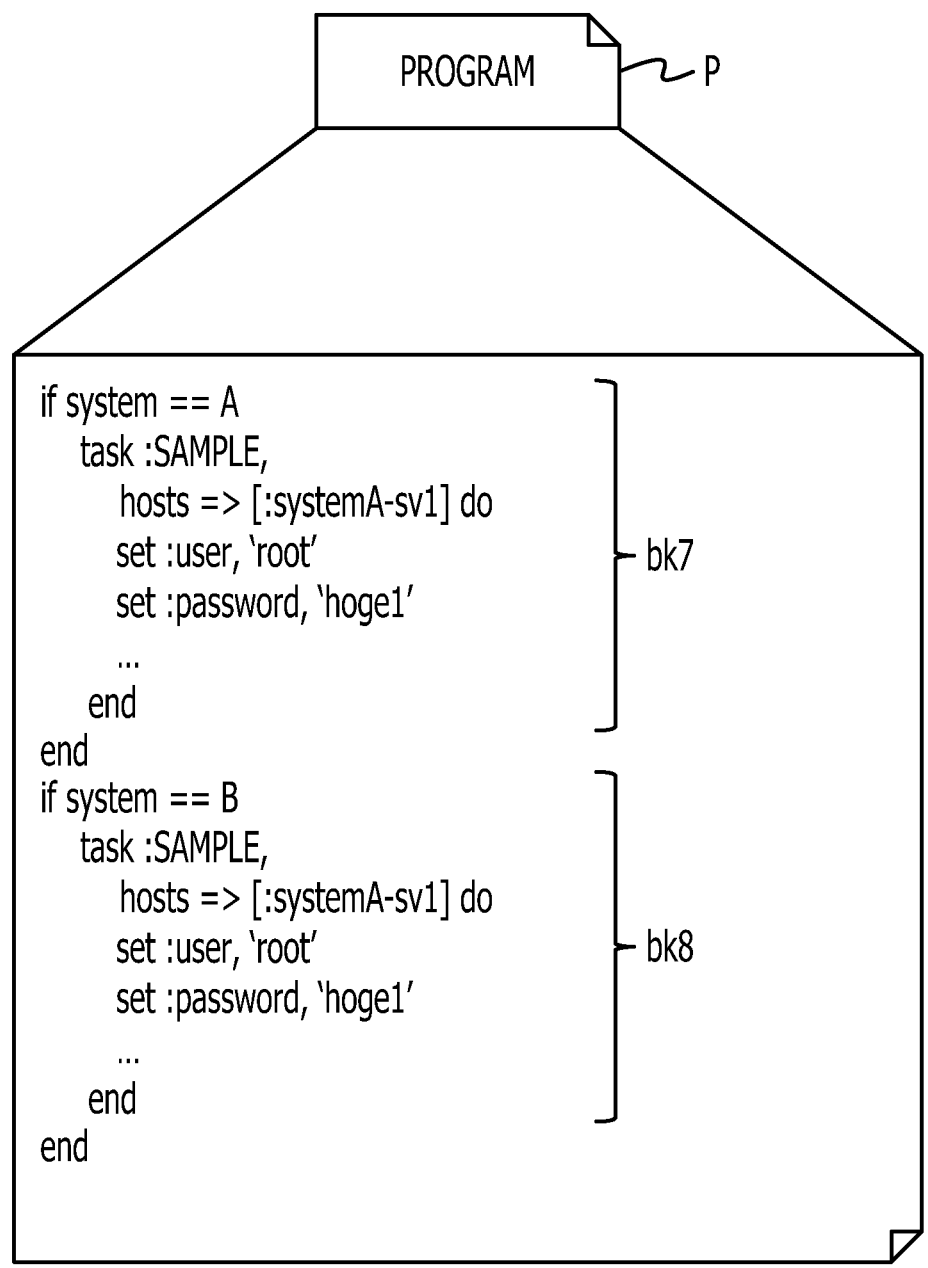
FIG. 17 illustrates a specific example of the program which runs on both existing and new systems.

FIG. 17 illustrates a specific example of the program P which runs on both the existing and new systems. In FIG. 17, the program P includes the block bk7 of the task T with the task name "SAMPLE" and the block bk8 of the subtask ST with the task name "SAMPLE". When the existing system runs the program P, the task T with the task name "SAMPLE" is executed; when the new system runs it, the subtask ST with the task name "SAMPLE" is executed.

Fifth Example of Change

Next, assuming that there are sets of definition information df about the information processing apparatuses EM and NM, there will be described an example of a change to the program P in a case where the program P is applied to both the information processing apparatuses EM and NM of the existing and new systems.

Figure 18:
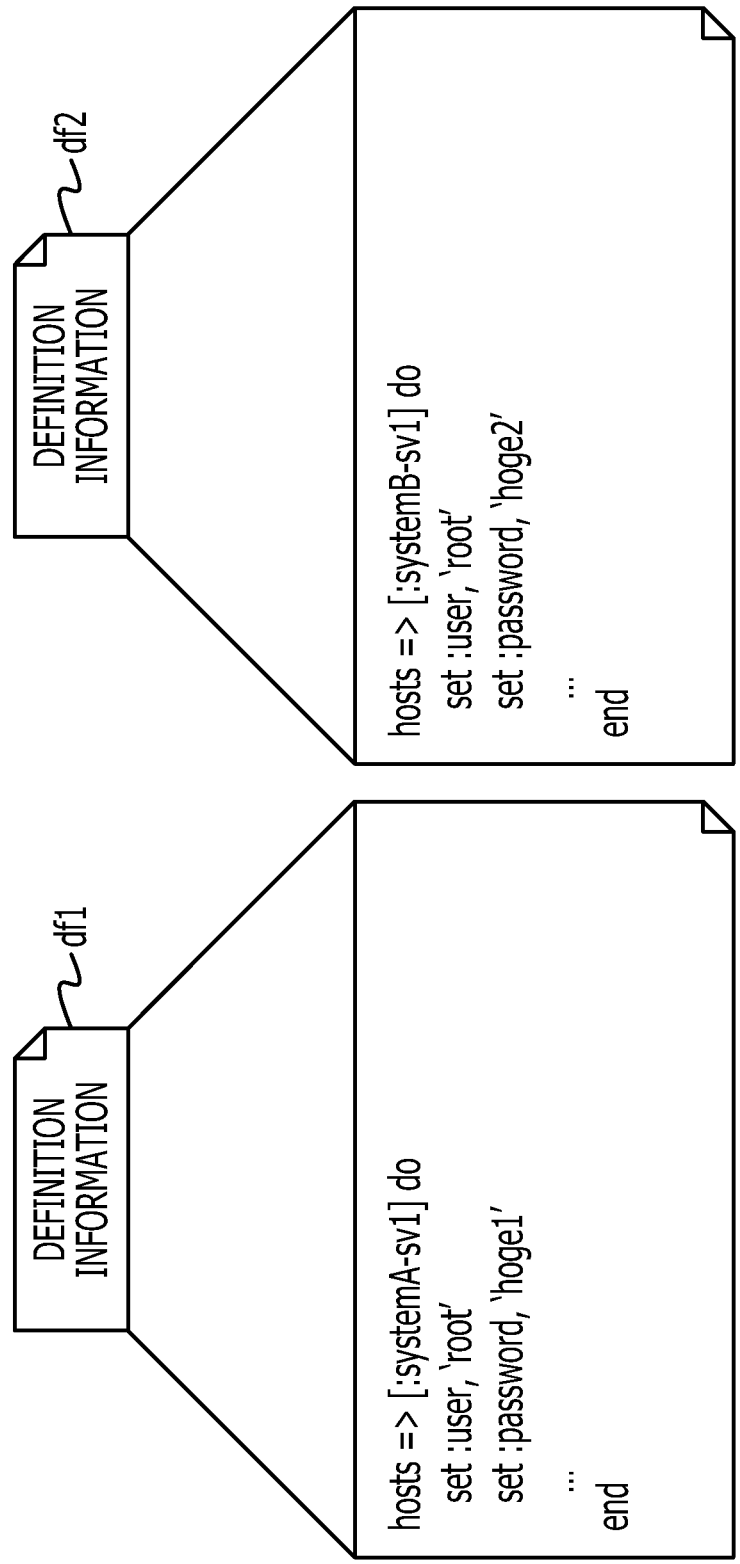
FIG. 18 illustrates a specific example of definition information.

FIG. 18 illustrates a specific example of definition information df. In FIG. 18, definition information df1 defines the values of the setting items set on the information processing apparatus EM of the existing system. For example, the definition information df1 defines the User (user name) value and the Password value set on the information processing apparatus EM with the host name "systemA-sv1" as "root" and "hoge1", respectively.

Definition information df2 defines the values of the setting items set on the information processing apparatus NM of the new system. For example, the definition information df2 defines the User (user name) value and the Password value set on the information processing apparatus NM with the host name "systemB-sv1" as "root" and "hoge2".

Hereafter, assume that the file name of the definition information df1 is "systemA-sample.def" and that the file name of the definition information df2 is "systemB-sample.def".

Figure 19:
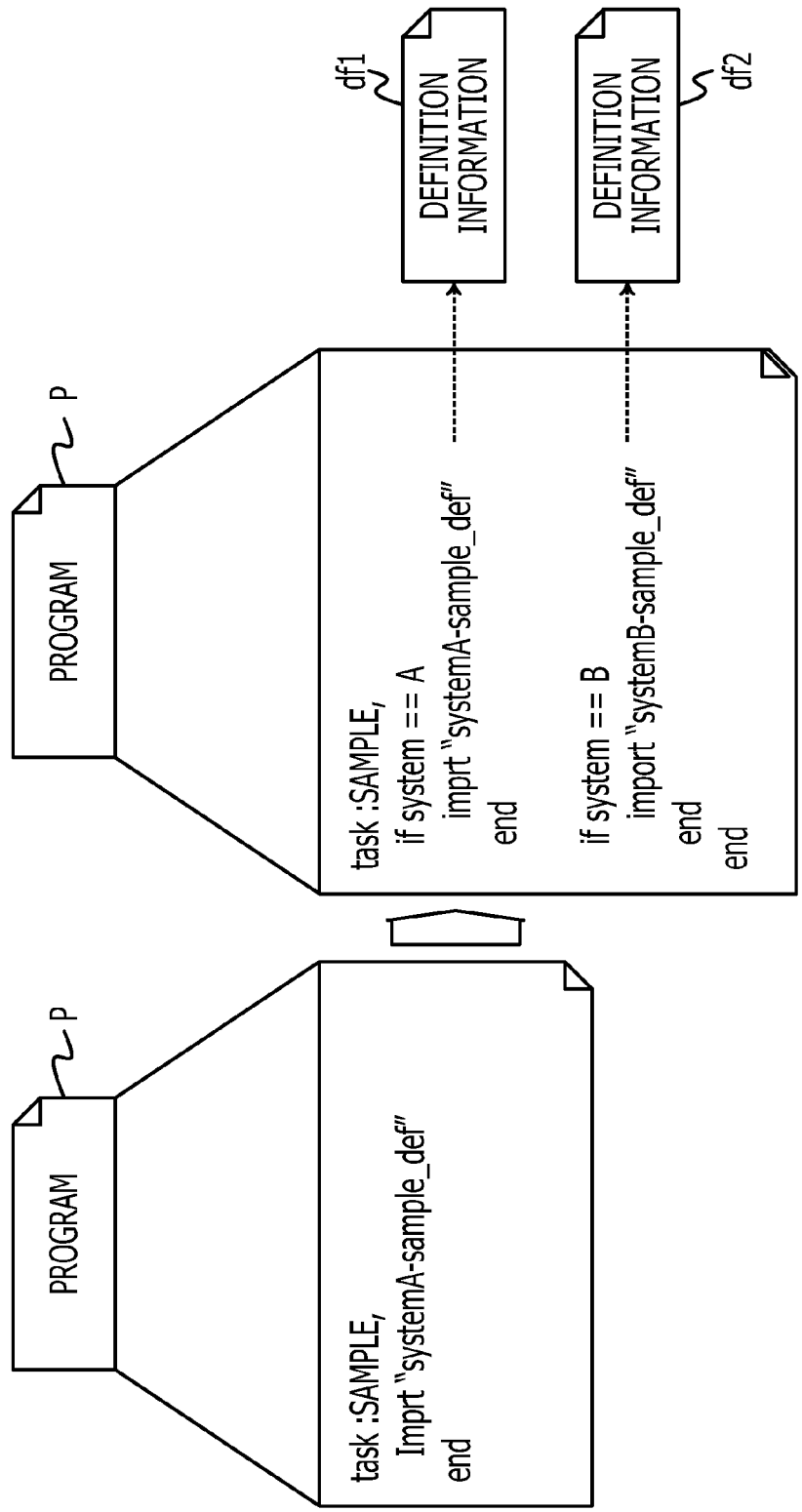
FIG. 19 illustrates a fifth example of a change to the program.

FIG. 19 illustrates a fifth example of a change to the program P. In FIG. 19, the change unit 505 changes the program P into a program P which runs on both the existing and new systems by dividing a task T with a task name "SAMPLE" described in the program P which runs on the existing system into tasks T corresponding to the existing and new systems, respectively.

Thus, when the existing system runs the resulting program P, it imports the definition information df1 and then executes the task T with the task name "SAMPLE". When the new system runs the resulting program P, it imports the definition information df2 and then executes the task T with the task name "SAMPLE".

While the example where the definition information df1 and definition information df2 are imported has been described above, the respective contents of the definition information df1 and definition information df2 may be described in the program P.

Change Process Performed by Change Apparatus 101

Next, a change process performed by the change apparatus 101 will be described.

Figure 20:
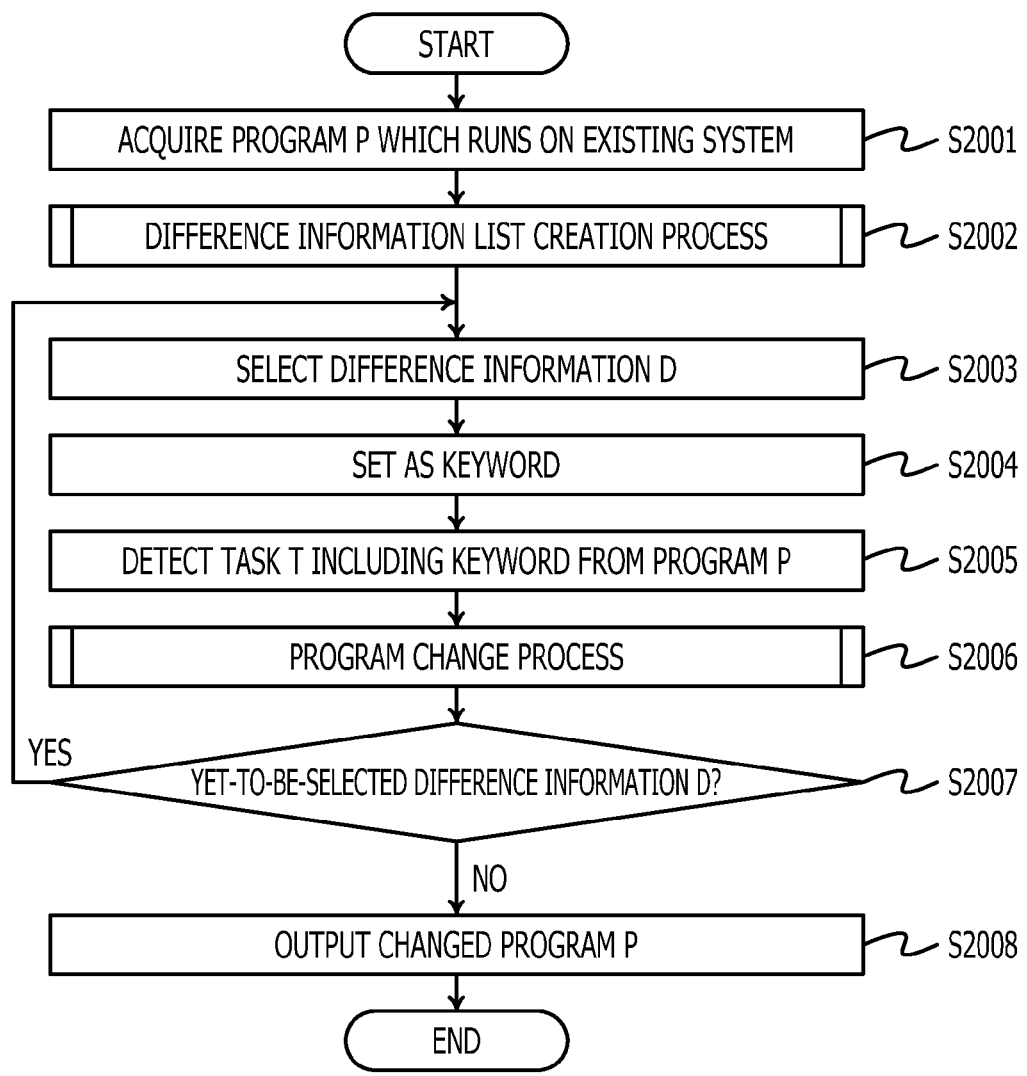
FIG. 20 is a flowchart illustrating an example of a change process performed by a change apparatus.

FIG. 20 is a flowchart illustrating an example of the change process performed by the change apparatus 101. In the flowchart of FIG. 20, first, the change apparatus 101 acquires the program P which runs on the existing system (step S2001). Then the change apparatus 101 performs a difference information list creation process for creating a difference information list DL (step S2002). Specific steps of the difference information list creation process will be described later with reference to FIG. 21.

Then the change apparatus 101 selects difference information D from the difference information list DL (step S2003). Then the change apparatus 101 refers to the difference information D and then sets, as a keyword, the value of a setting item in the configuration information of the information processing apparatus EM of the existing system which differs from the value of the corresponding setting item in the configuration information of the information processing apparatus NM of the new system (step S2004).

Then the change apparatus 101 detects a block bk of a task T including the keyword from the program P (step S2005). The change apparatus 101 then performs a process of changing the program P (step S2006). Specific steps of the program change process will be described later with reference to FIGS. 22 and 23.

The change apparatus 101 then determines whether there is difference information D which has yet to be selected from the difference information list DL (step S2007). If there is yet-to-be-selected difference information D (step S2007: Yes), the change apparatus 101 returns to step S2003 to select the yet-to-be-selected difference information D from the difference information list DL.

If there is no yet-to-be-selected difference information D (step S2007: No), the change apparatus 101 outputs the changed program P (step S2008), ending the process.

In this way, the program P to run on the new system is generated from the program P which runs on the existing system. Note that if blocks bk of multiple tasks T are detected in step S2005, the change apparatus 101 performs a process of changing the program P for each of the tasks T.

Difference Information List Creation Process

Next, there will be described specific steps of the difference information list creation process of step S2002 shown in FIG. 20.

Figure 21:
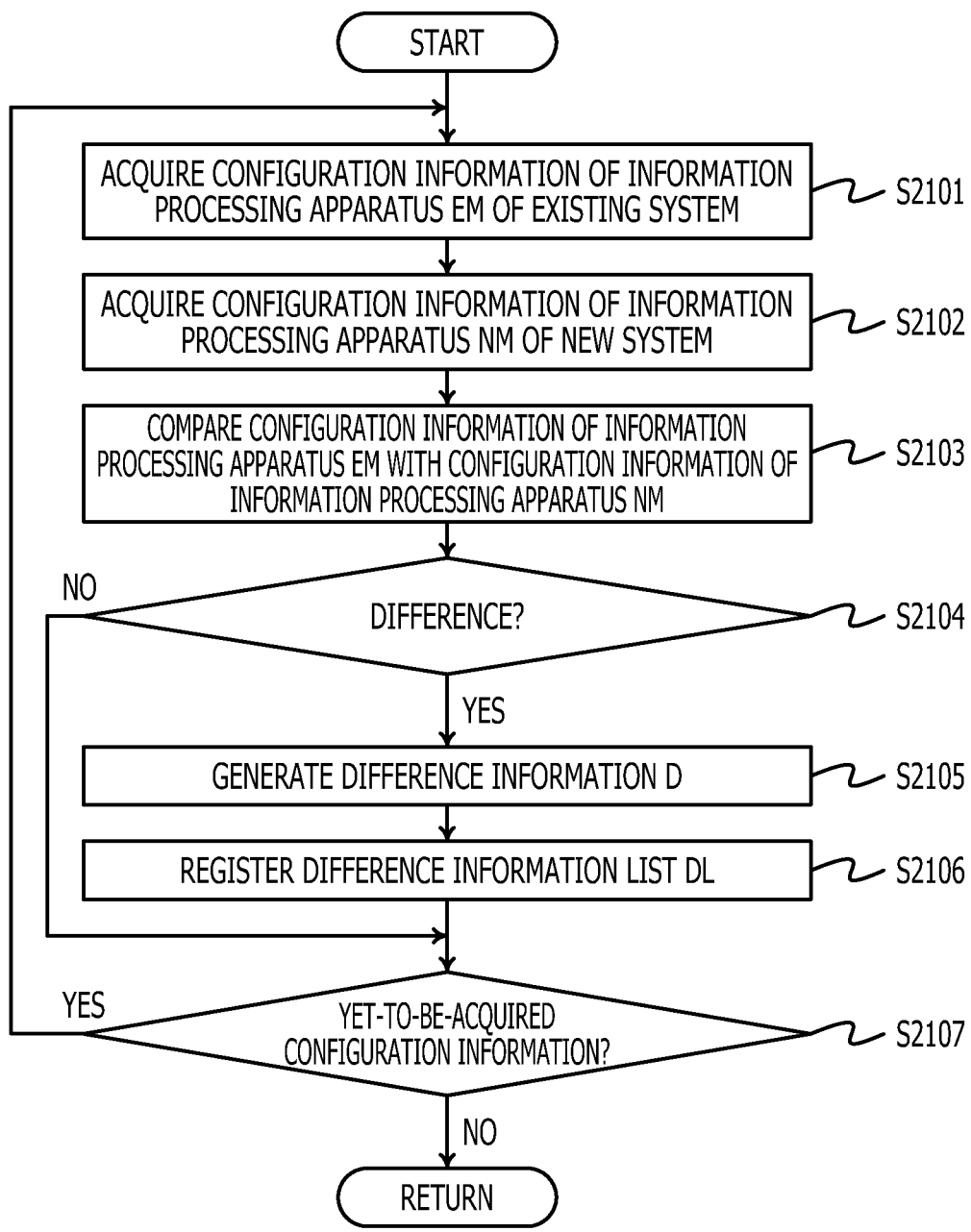
FIG. 21 is a flowchart illustrating an example of specific steps of a difference information list creation process.

FIG. 21 is a flowchart illustrating an example of specific steps of the difference information list creation process. In the flowchart of FIG. 21, first, the change apparatus 101 acquires configuration information of the information processing apparatus EM of the existing system from the CMDB 110 of the existing system (step S2101).

Then the change apparatus 101 acquires configuration information of the information processing apparatus NM of the new system from the CMDB 120 of the new system (step S2102). The change apparatus 101 then compares the configuration information of the information processing apparatus EM of the existing system with that of the information processing apparatus NM of the new system (step S2103).

Then, based on the comparison result, the change apparatus 101 determines whether there is a difference between the configuration information of the information processing apparatus EM of the existing system and that of the information processing apparatus NM of the new system (step S2104). If there is no difference (step S2104: No), the change apparatus 101 proceeds to step S2107.

If there is a difference (step S2104: Yes), the change apparatus 101 generates difference information D representing the difference between the configuration information of the information processing apparatus EM of the existing system and the configuration information of the information processing apparatus NM of the new system (step S2105). The change apparatus 101 then registers the generated difference information D in the difference information list DL (step S2106).

The change apparatus 101 then determines whether there is configuration information of the information processing apparatus EM which has yet to be acquired from the CMDB 110 of the existing system (step S2107). If there is yet-to-be-acquired configuration information of the information processing apparatus EM (step S2107: Yes), the change apparatus 101 returns to step S2101 to acquire the yet-to-be-acquired configuration information of the information processing apparatus EM from the CMDB 110 of the existing system.

In contrast, if there is no yet-to-be-acquired configuration information of the information processing apparatus EM (step S2107: No), the change apparatus 101 ends the difference information list creation process and then returns to the step in which this process has been called.

In this way, there is created a difference information list DL which is a list of the difference information D representing the difference between the configuration information of the information processing apparatus EM of the existing system and the configuration information of the information processing apparatus NM of the new system.

Program Change Process

Next, there will be described specific steps of the program change process of step S2006 shown in FIG. 20.

Figure 22:
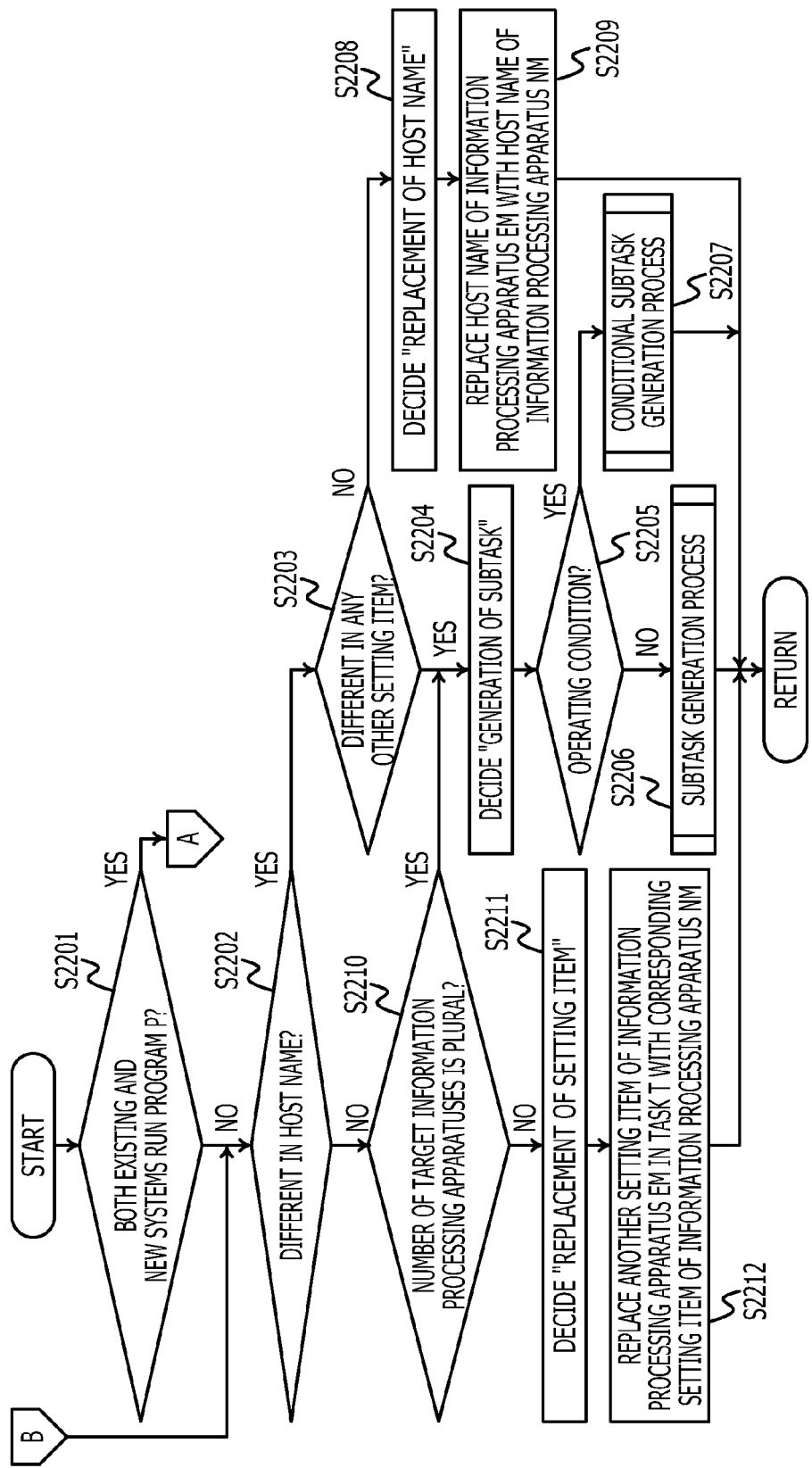
FIG. 22 is a flowchart illustrating an example of specific steps of a program change process.
Figure 23:
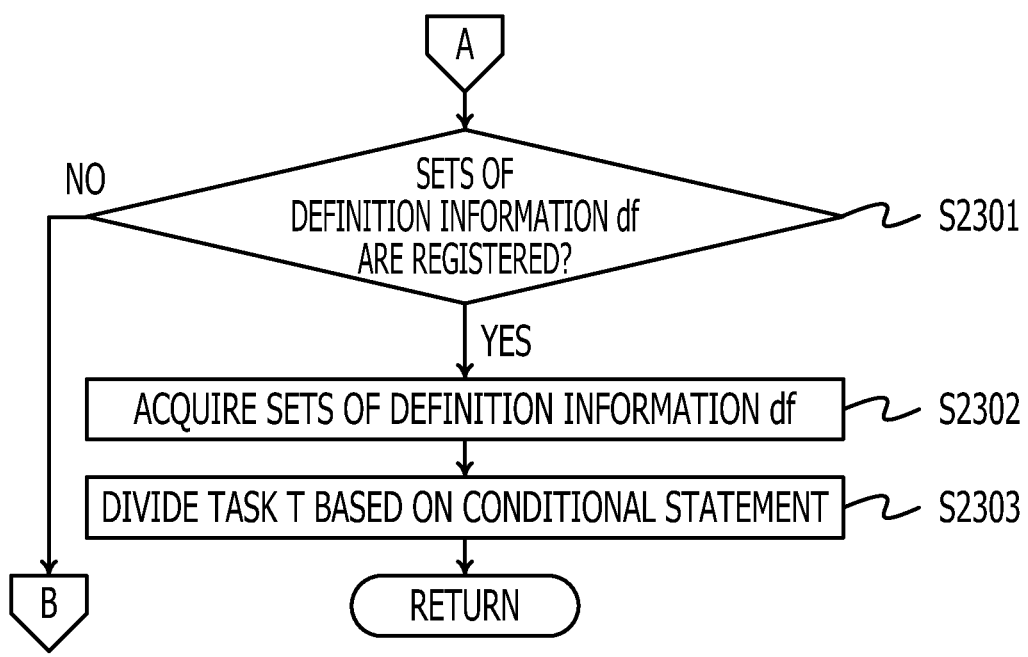
FIG. 23 is a flowchart illustrating an example of specific steps of a program change process.

FIGS. 22 and 23 are flowcharts illustrating an example of specific steps of the program change process. In the flowchart of FIG. 22, first, the change apparatus 101 determines whether both the existing and new systems run the program P (step S2201).

If only the new system runs the program P (step S2201: No), the change apparatus 101 determines whether the information processing apparatuses EM and NM differ from each other in the value of the host name, based on difference information D (step S2202). If these information processing apparatuses differ from each other in the value of the host name (step S2202: Yes), the change apparatus 101 determines whether the information processing apparatuses EM and NM differ from each other in the value of any setting item other than the host name (step S2203).

If these information processing apparatuses also differ from each other in the value of any other setting item (step S2203: Yes), the change apparatus 101 decides "Generation of Subtask" as a program change rule (step S2204). The change apparatus 101 then determines whether any operating condition is set on the information processing apparatus NM of the new system (step S2205).

If no operating condition is set (step S2205: No), the change apparatus 101 performs a subtask generation process (step S2206), ending the program change process. Then the change apparatus 101 returns to the step where this process has been called. Specific steps of the subtask generation process will be described later with reference to FIG. 24.

If any operating condition is set (step S2205: Yes), the change apparatus 101 performs a conditional subtask generation process (step S2207), ending the program change process. Then the change apparatus 101 returns to the step where this process has been called. Specific steps of the conditional subtask generation process will be described later with reference to FIG. 25.

If the information processing apparatuses EM and NM are the same in the values of the other setting items in step S2203 (step S2203: No), the change apparatus 101 decides "Replacement of Host Name" as a program change rule (step S2208). The change apparatus 101 then replaces the value of the host name of the information processing apparatus EM in the block bk of the task T with the value of the host name of the information processing apparatus NM (step S2209), ending the program change process. Then the change apparatus 101 returns to the step where this process has been called.

If the information processing apparatuses EM and NM are the same in the value of the host name in step S2202 (step S2202: No), the change apparatus 101 determines whether the number of target information processing apparatuses of the task T is plural (step S2210). If the number of target information processing apparatuses of the task T is plural (step S2210: Yes), the change apparatus 101 proceeds to step S2204.

In contrast, if the number of target information processing apparatuses of the task T is single (step S2210: No), the change apparatus 101 decides "Replacement of Setting Item" as a program change rule (step S2211).

The change apparatus 101 then replaces the value of another setting item on the information processing apparatus EM in the block bk of the task T with the value of a corresponding setting item on the information processing apparatus NM (step S2212), ending the program change process. Then the change apparatus 101 returns to the step where this process has been called.

If both the existing and new systems run the program P in step S2201 (step S2201: Yes), the change apparatus 101 proceeds to step S2301 shown in FIG. 23.

In the flowchart of FIG. 23, first, the change apparatus 101 determines whether sets of definition information df about the information processing apparatuses EM and NM are registered in CMDBs 110 and 120, respectively (step S2301). If no sets of definition information df about the information processing apparatuses EM and NM have been registered (step S2301: No), the change apparatus 101 proceeds to step S2202 shown in FIG. 22.

If sets of definition information df about the information processing apparatuses EM and NM are registered (step S2301: Yes), the change apparatus 101 acquires the sets of definition information df about the information processing apparatuses EM and NM from the CMDBs 110 and 120, respectively (step S2302). The change apparatus 101 then changes the program P by dividing the task T into tasks T corresponding to the existing and new systems, respectively, based on a conditional statement (step S2303), ending the program change process. Then the change apparatus 101 returns to the step in which this process has been called.

As seen above, the program change rule is decided based on details of the difference information D representing the difference between the configuration information of the information processing apparatus EM of the existing system and the configuration information of the information processing apparatus NM of the new system and then the program P is changed according to the program change rule.

Subtask Generation Process

Next, there will be described specific steps of the subtask generation process of step S2006 shown in FIG. 22.

Figure 24:
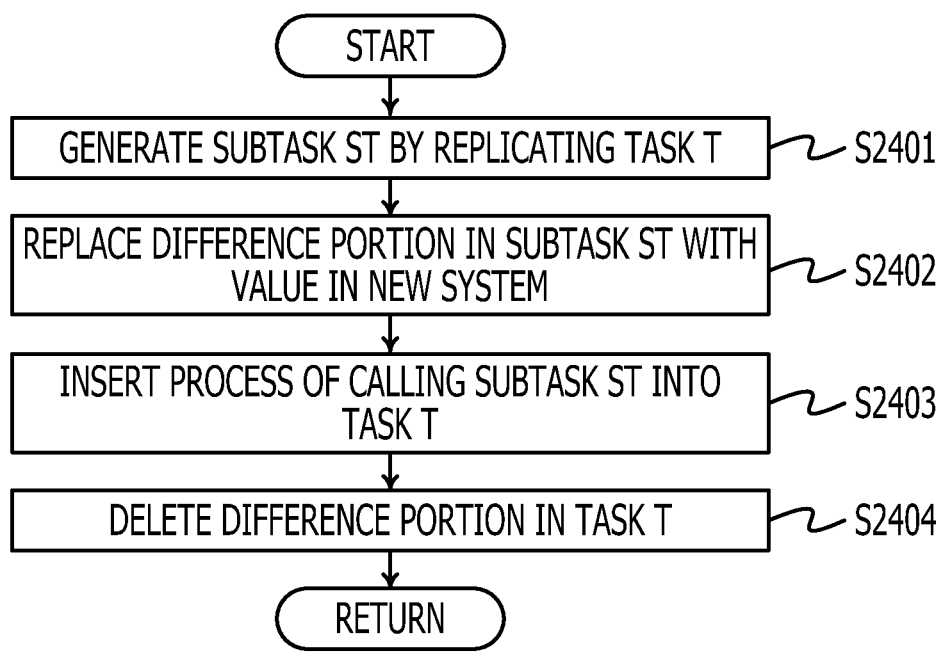
FIG. 24 is a flowchart illustrating an example of specific steps of a subtask generation process.

FIG. 24 is a flowchart illustrating an example of specific steps of the subtask generation process. In the flowchart of FIG. 24, first, the change apparatus 101 generates a block bk of a subtask ST by replicating the block bk1 of the task T (step S2401).

Then the change apparatus 101 refers to difference information D and then replaces the difference portion (the value of a setting item) in the block bk of the subtask ST with the value of a corresponding setting item on the information processing apparatus NM of the new system (step S2402). The change apparatus 101 then inserts a process of calling the subtask ST into the block bk of the task T (step S2403).

The change apparatus 101 then deletes the difference portion (the value of the host name of the information processing apparatus EM) in the block bk of the task T (step S2404), ending the subtask generation process. Then the change apparatus 101 returns to the step in which this process has been called.

The resulting block bk of the subtask ST is applied to the information processing apparatus NM of the new system.

Conditional Subtask Generation Process

Next, there will be described specific steps of the conditional subtask generation process of step S2007 shown in FIG. 22.

Figure 25:
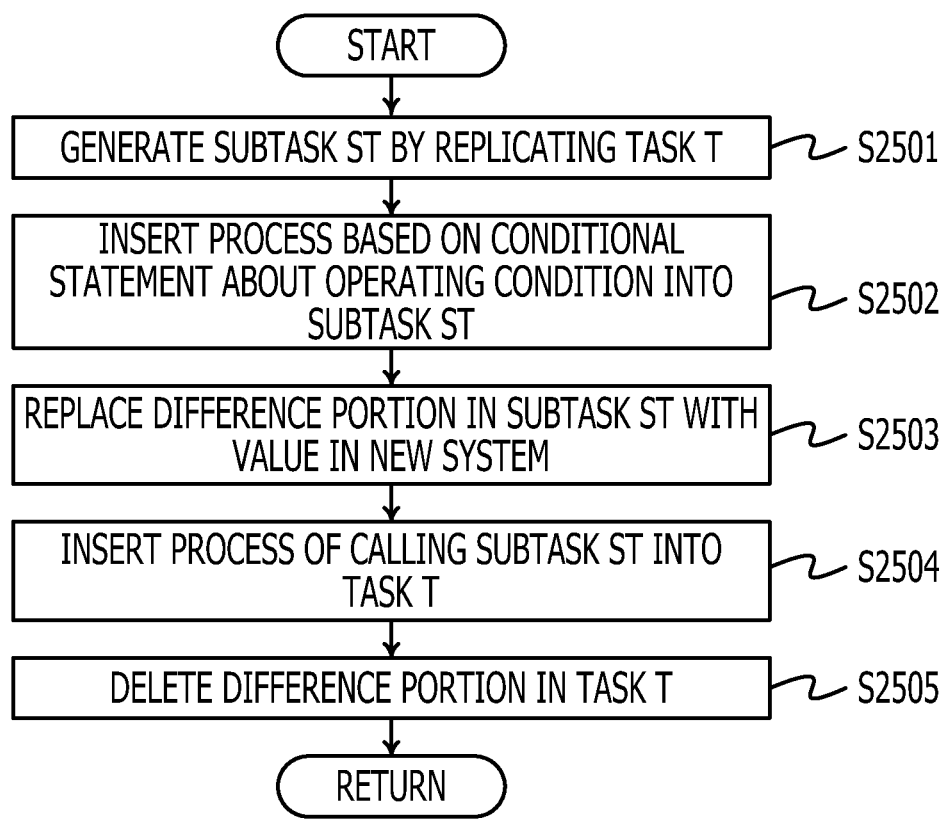
FIG. 25 is a flowchart illustrating an example of specific steps of a conditional subtask generation process.

FIG. 25 is a flowchart illustrating an example of specific steps of the conditional subtask generation process. In the flowchart of FIG. 25, first, the change apparatus 101 generates a block bk of a subtask ST by replicating the block bk1 of the task T (step S2501).

Then the change apparatus 101 inserts a process based on a conditional statement about the operating condition of the information processing apparatus NM into the block bk of the subtask ST (step S2502). The change apparatus 101 then refers to the difference information D and replaces the difference portion (the value of the setting item) in the block bk of the subtask ST with the value of the corresponding setting item on the information processing apparatus NM of the new system (step S2503).

Then the change apparatus 101 inserts a process of calling the subtask ST into the block bk of the task T (step S2504). The change apparatus 101 then deletes the difference portion (the value of the host name of the information processing apparatus EM) in the block bk of the task T (step S2505), ending the conditional subtask generation process. Then the change apparatus 101 returns to the step in which this process has been called.

In this way, there is generated the block bk of the subtask ST to be applied to the information processing apparatus NM of the new system on which an operating condition such as maintenance mode is set.

As described above, the change apparatus 101 acquires the difference information D representing the difference between the configuration information of the information processing apparatus EM of the existing system and the configuration information of the information processing apparatus NM of the new system. The detection unit 101 also detects the block bk of the task k corresponding to the difference information D from the program P applied to the information processing apparatus EM of the existing system. The block bk of the task T is the target to be changed in the program P.

The change apparatus 101 also determines whether the information processing apparatuses EM and NM differ from each other in the value of Host Name (Hosts), based on the difference information D. The change apparatus 101 also determines whether the information processing apparatuses EM and NM differ from each other in the value of any setting item other than the host name. If the information processing apparatuses EM and NM differ from each other in the value of the host name and if these information processing apparatuses also differ from each other in the value of any other setting item, the change apparatus 101 decides "Generation of Subtask" as a program change rule.

Thus, it is determined that the change apparatus 101 only has to apply the program change rule "Generation of Sub-task" to the block bk of the task T in the program P in order to apply the program P to the information processing apparatus NM of the new system.

If the information processing apparatuses EM and NM differ from each other in the value of the host name and if these information processing apparatuses are the same in the values of the other setting items, the change apparatus 101 decides "Replacement of Host Name" as a program change rule. Thus, it is determined that the change apparatus 101 only has to apply the program change rule "Generation of Subtask" to the block bk of the task T in the program P in order to apply the program P to the information processing apparatus NM of the new system.

If the information processing apparatuses EM and NM are the same in the value of the host name, the change apparatus 101 refers to the block bk of the task T and then determines whether the number of target information processing apparatuses of the task T is plural. If the number of target information processing apparatuses of the task T is plural, the change apparatus 101 decides "Generation of Subtask" as a program change rule. Thus, it is determined that the change apparatus 101 only has to apply the program change rule "Generation of Subtask" to the block bk of the task T in the program P in order to apply the program P to the information processing apparatus NM of the new system.

If the information processing apparatuses EM and NM are the same in the value of the host name and if the number of target information processing apparatuses of the task T is single, the change apparatus 101 decides "Replacement of Setting Item" as a program change rule. Thus, it is determined that the change apparatus 101 only has to apply the program change rule "Replacement of Setting Item" to the block bk of the task T in the program P in order to apply the program P to the information processing apparatus NM of the new system.

If the change apparatus 101 decides "Generation of Subtask" as a program change rule, it generates a block bk of a subtask ST by replicating the block bk1 of the task T. The change apparatus 101 then refers to the difference information D and replaces the difference portion (the value of a setting item) in the block bk of the subtask ST with the value of the corresponding setting item on the information processing apparatus NM of the new system. The change apparatus 101 then inserts a process of calling the subtask ST into the block bk of the task T, as well as deletes the difference portion in the block bk of the task T (the value of the host name of the information processing apparatus EM).

The resulting block bk of the subtask ST is applied to the information processing apparatus NM of the new system. When executing the task T in the program P, the subtask ST is called and executed.

If an operating condition is set on the information processing apparatus NM of the new system, the change apparatus 101 inserts a process based on a conditional statement about the operating condition of the information processing apparatus NM into the block bk of the subtask ST. Thus, the subtask ST is executed according to the operating condition set on the information processing apparatus NM of the new system.

If the change apparatus 101 decides "Replacement of Host Name" as a program change rule, it replaces the value of the host name of the information processing apparatus EM in the block bk of the task T with the value of the host name of the information processing apparatus NM. Thus, the block bk of the task T is changed in such a manner to be applicable to the information processing apparatus NM of the new system.

If the change apparatus 101 decides "Replacement of Setting Item" as a program change rule, it replaces the value of another setting item on the information processing apparatus EM in the block bk of the task T with the value of the corresponding setting item of the information processing apparatus NM. Thus, the block bk of the task T is changed in such a manner to be applicable to the information processing apparatus NM of the new system.

If both the existing and new systems run the program P, the change apparatus 101 determines whether sets of definition information df about the information processing apparatuses EM and NM are registered in the CMDBs 110 and 120, respectively. If sets of definition information df about the information processing apparatuses EM and NM are registered, the change apparatus 101 changes the program P by dividing the task T into tasks T corresponding to the existing and new systems based on a conditional statement. The resulting program P runs on both the existing and new systems.

If sets of definition information df about the information processing apparatuses EM and NM have yet to be registered, the change apparatus 101 generates a program P which changes the process (task T or subtask ST) to be performed in accordance with the system which runs the program P (the existing system or new system), by using a conditional statement such as an if statement. The program P thus generated runs on both the existing and new systems.

In view of the foregoing, the change apparatus 101 reduces the man-hours related to the operation of transferring the program P between the systems. Further, since the program P can be described without having to become aware of a change to the configuration information between the systems, it is possible to increase the coding speed.

The change method described in the present embodiment is performed when a computer such as a personal computer or workstation executes a previously prepared program. This change program is recorded on a computer-readable recording medium such as a hard disk, flexible disk (FD), CD-ROM, MO, or DVD and then executed when a computer reads it from the recording medium. This change program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method performed by a computer, the method comprising:
    determining a difference between first configuration information related to a first information processing apparatus and second configuration information related to a second information processing apparatus, a plurality of items being set on each of the first and second information processing apparatuses, the plurality of items including at least a first setting item identifying each information processing apparatus and a second setting item other than the first setting item;
    determining a portion of a first program executed by the first information processing apparatus, the portion corresponding to a first block indicating a first process defined by the first program and corresponding to the difference between the first configuration information and the second configuration information;
    determining whether the first setting item of the first information processing apparatus differs from the first setting item of the second information processing apparatus;
    determining whether the second setting item of the first information processing apparatus differs from the second setting item of the second information processing apparatus;
    selecting, among a plurality of types of change, a type of change to be applied to the portion of the first program based on the difference, the plurality of types of change including at least a first type of change and a second type of change, the first type of change being changing the first block indicating the first process into a second block indicating a second process different from the first process, and the second type of change being replacing a first value of a first setting item included in the first block with a second value, the second type of the change being selected when it is determined that the first setting item of the first information processing apparatus differs from the first setting item of the second information processing apparatus and the second setting item of the first information processing apparatus does not differ from the second setting item of the second information processing apparatus;
    changing the portion of the first program based on the selected type of change; and
    generating a second program to be executed by the second information processing apparatus, the generated second program including the changed portion of the first program.

2. The method according to claim 1, further comprising:
    acquiring difference information representing the difference between the first configuration information and the second configuration information,
    wherein the determining of the portion of the first program determines the portion based on the difference information.

3. The method according to claim 1, further comprising:
    determining whether there is definition information which defines values of respective setting items on the first and second information processing apparatuses; and
    generating the second block based on the definition information when the definition information exists.

4. method according to claim 3, wherein
    the method further comprises:
        when the definition information does not exist, determining whether the first and second information processing apparatuses differ from each other in respective values of the first and second setting items, based on the difference.

5. The method according to claim 1, wherein
    the selecting selects the type of change which generates the second block as the type of change when the first and second information processing apparatuses differ from each other in the respective values of the first and second setting items.

6. The method according to claim 5, further comprising:
    generating the second block by replicating the first block when the type of change which generates the second block different from the first block is selected as the type of change;

replacing values of setting items included in the second block with values of the setting items related to the second information processing apparatus based on details of the difference;
deleting a value of the first setting item related to the first information processing apparatus in the first block; and
inserting a description for calling the different process into the first block.

7. The method according to claim 6, wherein
the inserting inserts a conditional statement about the operating condition into the second block when an operating condition is set on the second information processing apparatus.

8. The method according to claim 1, wherein
the selecting selects the type of change which replaces the value of the first setting item in the first block as the type of change when the first and second information processing apparatuses differ from each other in a value of the first setting item and when the first and second information processing apparatuses are the same in a value of the second setting item.

9. The method according to claim 8, further comprising:
replacing the value of the first setting item related to the first information processing apparatus in the first block with the value of the first setting item related to the second information processing apparatus when the type of change which replaces the value of the first setting item in the first block is selected as the type of change in the selecting.

10. The method according to claim 1, wherein
the method further comprises:
determining whether the process is performed by a plurality of target information processing apparatuses when the first and second information processing apparatuses are the same in respective values of the setting items, wherein the selecting selects the type of change which generates the second block different from the first block as the type of change when the process is performed by a plurality of target information processing apparatuses.

11. The method according to claim 10, wherein the selecting selects the type of change which replaces the value of the second setting item in the first block as the type of change when the process is not performed by a plurality of target information processing apparatuses.

12. The method according to claim 11, further comprising:
replacing the value of the second setting item related to the first information processing apparatus in the first block with the value of the second setting item related to the second information processing apparatus when the type of change which replaces the value of the second setting item in the first block is selected as the type of change in the selecting.

13. The method according to claim 1, wherein the first information processing apparatus is included in an existing system, and the second information processing apparatus is included in a new system which is constructed based on the existing system.

14. An apparatus comprising:
a memory; and
a processor coupled to the memory and configured to:
determine a difference between first configuration information related to a first information processing apparatus and second configuration information related to a second information processing apparatus, a plurality of items being set on each of the first and second information processing apparatuses, the plurality of items including at least a first setting item identifying each information processing apparatus and a second setting item other than the first setting item,
determine a first portion of a program executed by the first information processing apparatus, the portion corresponding to a first block indicating a first process defined by the first program and corresponding to the difference between the first configuration information and the second configuration information,
determine whether the first setting item of the first information processing apparatus differs from the first setting item of the second information processing apparatus;
determine whether the second setting item of the first information processing apparatus differs from the second setting item of the second information processing apparatus;
select, among a plurality of types of change, a type of change to be applied to the portion of the first program, based on the difference, the plurality of types of change including at least a first type of change and a second type of change, the first type of change being changing the first block indicating the first process into a second block indicating a second process different from the first process, and the second type of change being replacing a first value of a first setting item included in the first block with a second value, the second type of the change being selected when it is determined that the first setting item of the first information processing apparatus differs from the first setting item of the second information processing apparatus and the second setting item of the first information processing apparatus does not differ from the second setting item of the second information processing apparatus,
change the portion of the first program based on the selected type of change, and
generate a second program to be executed by the second information processing apparatus, the generated second program including the changed portion of the first program.

15. A non-transitory computer readable recording medium storing a program for causing a computer to execute a process, the process comprising:
determining a difference between first configuration information related to a first information processing apparatus and second configuration information related to a second information processing apparatus, a plurality of items being set on each of the first and second information processing apparatuses, the plurality of items including at least a first setting item identifying each information processing apparatus and a second setting item other than the first setting item;
determining a portion of a first program executed by the first information processing apparatus, the portion corresponding to a first block indicating a first process defined by the first program and corresponding to the difference between the first configuration information and the second configuration information;
determining whether the first setting item of the first information processing apparatus differs from the first setting item of the second information processing apparatus;

determining whether the second setting item of the first information processing apparatus differs from the second setting item of the second information processing apparatus;
selecting, among a plurality of types of change, a type of change to be applied to the portion of the first program, based on the difference, the plurality of types of change including at least a first type of change and a second type of change, the first type of change being changing the first block indicating the first process into a second block indicating a second process different from the first process, and the second type of change being replacing a first value of a first setting item included in the first block with a second value, the second type of the change being selected when it is determined that the first setting item of the first information processing apparatus differs from the first setting item of the second information processing apparatus and the second setting item of the first information processing apparatus does not differ from the second setting item of the second information processing apparatus;
changing the portion of the first program based on the selected type of change; and
generating a second program to be executed by the second information processing apparatus, the generated second program including the changed portion of the first program.

16. The non-transitory computer readable recording medium according to claim 15, wherein the process further comprises:
acquiring difference information representing the difference between the first configuration information and the second configuration information, wherein
the determining of the portion of the first program determines the portion based on the difference information.

17. The non-transitory computer readable recording medium according to claim 15,
wherein the selecting selects the type of change which generates the second block as the type of change when the first and second information processing apparatuses differ from each other in the respective values of the first and second setting items.

18. The non-transitory computer readable recording medium according to claim 15,
wherein the selecting selects the type of change which replaces the value of the first setting item in the process as the type of change when the first and second information processing apparatuses differ from each other in a value of the first setting item and when the first and second information processing apparatuses are the same in a value of the second setting item.

* * * * *